(12) United States Patent
O'Dowd

(10) Patent No.: US 12,066,585 B2
(45) Date of Patent: Aug. 20, 2024

(54) WIDE-TOW SOURCE SURVEYING WITH SUBLINE INFILL

(71) Applicant: PGS Geophysical AS, Oslo (NO)

(72) Inventor: David O'Dowd, Oslo (NO)

(73) Assignee: PGS Geophysical AS, Oslo (NO)

( * ) Notice: Subject to any disclaimer, the term of this patent is extended or adjusted under 35 U.S.C. 154(b) by 61 days.

(21) Appl. No.: 17/153,259

(22) Filed: Jan. 20, 2021

(65) Prior Publication Data

US 2021/0247533 A1    Aug. 12, 2021

Related U.S. Application Data

(60) Provisional application No. 62/971,736, filed on Feb. 7, 2020.

(51) Int. Cl.
    *G01V 1/38*    (2006.01)
    *B63B 21/66*   (2006.01)
    *G01V 1/20*    (2006.01)

(52) U.S. Cl.
    CPC ............ *G01V 1/3808* (2013.01); *B63B 21/66* (2013.01); *G01V 1/201* (2013.01); *G01V 1/3826* (2013.01)

(58) Field of Classification Search
    CPC .... G01V 1/3808; G01V 1/201; G01V 1/3826; G01V 2210/169; B63B 21/66
    See application file for complete search history.

(56) References Cited

U.S. PATENT DOCUMENTS

| | | |
|---|---|---|
| 3,249,177 A | 5/1966 | Chelminski |
| 4,481,611 A | 11/1984 | Burrage |
| 4,727,956 A | 3/1988 | Huizer |
| 4,974,212 A | 11/1990 | Sheiman |
| 5,281,773 A | 1/1994 | Duren |

(Continued)

FOREIGN PATENT DOCUMENTS

| | | |
|---|---|---|
| EP | 0 525 391 A1 | 2/1993 |
| EP | 2 508 918 B1 | 10/2012 |

(Continued)

OTHER PUBLICATIONS

Brice, Tim, et al.—"Wide-tow source configurations for towed multimeasurement streamer acquisition," 2015 SEG New Orleans Annual Meeting, pp. 86-88.

(Continued)

*Primary Examiner* — Daniel L Murphy

(57) ABSTRACT

A method includes: towing sources in a wide-tow source survey configuration; actuating at least one of the sources to create a signal; detecting the signal with a first receiver of a first plurality of streamers; and detecting the signal with a second receiver of a second plurality of streamers, wherein: the second plurality of streamers are interspersed with streamers from the first plurality of streamers in the port outer region and in the starboard outer region. A system includes: sources in a wide-tow source survey configuration and coupled to the survey vessel; a first plurality of streamers comprising a regular streamer spread and coupled to the survey vessel; and a second plurality of streamers coupled to the survey vessel, wherein: the second plurality of streamers are interspersed with streamers from the first plurality of streamers in the port outer region and in the starboard outer region.

29 Claims, 19 Drawing Sheets

(56) References Cited

U.S. PATENT DOCUMENTS

| | | |
|---|---|---|
| 5,402,391 A | 3/1995 | Cordsen |
| 5,430,689 A | 7/1995 | Rigsby et al. |
| 5,443,027 A | 8/1995 | Owsley et al. |
| 5,771,202 A | 6/1998 | Bale et al. |
| 5,924,049 A | 7/1999 | Beasley et al. |
| 5,973,995 A | 10/1999 | Walker et al. |
| 6,011,752 A | 1/2000 | Ambs et al. |
| 6,021,379 A | 2/2000 | Duren et al. |
| 6,028,822 A | 2/2000 | Lansley et al. |
| 6,144,342 A | 11/2000 | Bertheas et al. |
| 6,665,618 B1 | 12/2003 | Thomas et al. |
| 6,882,938 B2 | 4/2005 | Vaage et al. |
| 7,092,315 B2 | 8/2006 | Olivier |
| 7,376,045 B2 | 5/2008 | Falkenberg et al. |
| 7,400,552 B2 | 7/2008 | Moldoveanu et al. |
| 7,423,929 B1 | 9/2008 | Olivier |
| 7,916,576 B2 | 3/2011 | Beasley et al. |
| 7,969,818 B2 | 6/2011 | Burren |
| 8,488,409 B2 | 7/2013 | Hill et al. |
| 8,730,760 B2 | 5/2014 | Cambois et al. |
| 8,818,730 B2 | 8/2014 | Eick et al. |
| 8,837,255 B2 | 9/2014 | Ross et al. |
| 8,897,094 B2 | 11/2014 | Eick et al. |
| 8,971,152 B2 | 3/2015 | Chelminski |
| 9,010,484 B2 | 4/2015 | Coste et al. |
| 9,188,692 B2 | 11/2015 | Haumonte |
| 9,746,570 B2 | 8/2017 | Mensch |
| 9,835,745 B2 | 12/2017 | Desrues |
| 10,139,511 B2 | 11/2018 | Mensch |
| 10,379,256 B2 | 8/2019 | Adams et al. |
| 10,627,534 B2 | 4/2020 | Bernitsas |
| 11,480,701 B2 | 10/2022 | Hegna et al. |
| 11,493,651 B2 | 11/2022 | Long |
| 2004/0013037 A1 | 1/2004 | Vaage |
| 2005/0027454 A1 | 2/2005 | Vaage et al. |
| 2006/0050611 A1 | 3/2006 | Borresen |
| 2006/0227658 A1 | 10/2006 | Toennessen et al. |
| 2006/0239117 A1 | 10/2006 | Singh et al. |
| 2007/0223307 A1 | 9/2007 | Storteig et al. |
| 2007/0294036 A1 | 12/2007 | Strack et al. |
| 2008/0008033 A1 | 1/2008 | Fossum et al. |
| 2008/0011540 A1 | 1/2008 | Moldoveanu et al. |
| 2008/0144436 A1 | 6/2008 | Pickering et al. |
| 2009/0141587 A1 | 6/2009 | Welker et al. |
| 2009/0274004 A1 | 11/2009 | Ferber et al. |
| 2009/0296520 A1 | 12/2009 | Keers et al. |
| 2010/0002536 A1 | 1/2010 | Brewer et al. |
| 2010/0027374 A1 | 2/2010 | Moldoveanu et al. |
| 2010/0118645 A1 | 5/2010 | Welker |
| 2011/0158044 A1 | 6/2011 | Moldobveanu et al. |
| 2011/0199857 A1 | 8/2011 | Garden et al. |
| 2011/0242935 A1 | 10/2011 | Amundsen et al. |
| 2011/0305106 A1 | 12/2011 | Eick et al. |
| 2011/0305113 A1 | 12/2011 | Eick et al. |
| 2012/0048642 A1 | 3/2012 | Hopperstad et al. |
| 2013/0250720 A1 | 9/2013 | Monk et al. |
| 2013/0322205 A1 | 12/2013 | Widmaier et al. |
| 2014/0078862 A1* | 3/2014 | Guevel ............... G01V 1/3826 367/17 |
| 2014/0121977 A1 | 5/2014 | Lecocq |
| 2014/0269173 A1 | 9/2014 | Coste et al. |
| 2014/0269176 A1* | 9/2014 | Mattsson ............ G01V 1/3817 367/16 |
| 2014/0286128 A1 | 9/2014 | Grimm et al. |
| 2014/0376331 A1 | 12/2014 | Howieson et al. |
| 2015/0234071 A1 | 8/2015 | Hegna |
| 2016/0003959 A1 | 1/2016 | Bowman et al. |
| 2017/0017005 A1 | 1/2017 | Siliqi |
| 2017/0059727 A1 | 3/2017 | Eick et al. |
| 2017/0115419 A1 | 4/2017 | Van Groenestijn |
| 2017/0176636 A1 | 6/2017 | Adams et al. |
| 2017/0199292 A1 | 7/2017 | Toenessen et al. |
| 2017/0235003 A1 | 8/2017 | Elboth et al. |
| 2017/0363760 A1 | 12/2017 | Mensch et al. |
| 2018/0001977 A1 | 1/2018 | Toennessen |
| 2018/0164450 A1* | 6/2018 | Long ................... G01V 1/3808 |
| 2018/0164455 A1 | 6/2018 | Elboth et al. |
| 2018/0164457 A1 | 6/2018 | Beitz et al. |
| 2018/0321406 A1 | 11/2018 | Strand et al. |
| 2018/0335536 A1 | 11/2018 | Li et al. |
| 2018/0372900 A1 | 12/2018 | Lelaurin et al. |
| 2019/0120988 A1 | 4/2019 | O'Dowd |
| 2019/0219717 A1 | 7/2019 | Godoy et al. |
| 2019/0277987 A1 | 9/2019 | Long |
| 2020/0012004 A1 | 1/2020 | Elboth et al. |
| 2022/0099856 A1 | 3/2022 | Strand et al. |

FOREIGN PATENT DOCUMENTS

| | | | |
|---|---|---|---|
| EP | 2 280 294 B1 | 6/2014 | |
| EP | 3 118 655 A1 | 1/2017 | |
| EP | 3 206 052 A1 | 8/2017 | |
| GB | 2 429 541 A | 2/2007 | |
| GB | 2 517 071 A | 2/2015 | |
| GB | 2 545 542 A | 6/2017 | |
| GB | 2 559 845 A | 8/2018 | |
| GB | 2 589 011 A | 5/2021 | |
| GB | 2 592 125 A | 8/2021 | |
| RU | 7212 U1 | 7/1998 | |
| RU | 37 212 U1 | 4/2004 | |
| WO | 96 18117 A1 | 6/1996 | |
| WO | 02 25315 A2 | 3/2002 | |
| WO | 2005111657 A1 | 11/2005 | |
| WO | 2009092069 A1 | 7/2009 | |
| WO | 2011 103 081 A2 | 8/2011 | |
| WO | 2011 156 491 A1 | 12/2011 | |
| WO | 2014 152 125 A1 | 9/2014 | |
| WO | WO-2016009270 A1 * | 1/2016 | ............. G01V 1/005 |
| WO | 2017 102 289 A1 | 6/2017 | |
| WO | 2018 067 016 A1 | 4/2018 | |
| WO | 2018108979 A1 | 6/2018 | |
| WO | 2018 208 168 A1 | 11/2018 | |
| WO | 2019 073 050 A1 | 4/2019 | |
| WO | 2019246297 A1 | 12/2019 | |
| WO | 2020 249 701 A1 | 12/2020 | |

OTHER PUBLICATIONS

Chelminski, Steve, et al.—"Low-frequency pneumatic seismic sources," Geophysical Prospecting, received Mar. 2018, revision accepted Feb. 2019, European Association of Geoscientists & Engineers, pp. 1-10.

Dhelie, P. E., et al.—"Towards a seismic point source—Smaller, quieter and cheaper," 2017 SEG International Exposition and 87th Annual Meeting, pp. 85-89.

GWL—"GWL LF Source" brochure, date unknown, 1 page.

Hegna, Stian, et al.—"The low frequency output of marine air-gun arrays," 2011 SEG San Antonio Annual Meeting, pp. 77-81.

Johnston, R.C., et al.—"Special Report of the SEG Technical Standards Committee, SEG standards for specifying marine seismic energy sources," document converted from the original publication, 1988 [Special report on marine seismic energy source standards, Geophysics, 53. No. 04, 566-575 (Errata in GEO-53-7-1011)], pp. 1-14.

Long, Andrew—"Increasing Towed Streamer Survey Efficiency," A Clearer Image, a PGS publication, Aug. 2018, pp. 1-15.

Long, Andrew—"Source and streamer towing strategies for improved efficiency, spatial sampling and near offset coverage," First Break, vol. 35, Nov. 2017, pp. 71-74.

PGS—"Dual versus Triple Source," PGS Webpage https://www.pgs.com/marine-acquisition/tools-and-techniques/marine-seismic-sources/technology/dual-versus-triple-source/, Feb. 20, 2020, 5 pages.

PGS—"PGS and TGS Joint Venture MultiClient Project in the Barents Sea," PGS Webpage https://www.pgs.com/media-and-events/news/pgs-and-tgs-joint-venture-multiclient-project-in-the-barents-sea/, May 29, 2018, 3 pages.

PGS—"Ramform+Triple Source=Ultra HD3D," PGS Webpage https://www.pgs.com/publications/feature-stories/ramform-plus-triple-source-equals-ultra-hd3d/, Jun. 1, 2018, 5 pages.

(56) References Cited

OTHER PUBLICATIONS

Ronen, Shuki, et al.—Tuned Pulse Source—a new low frequency seismic source, 2017 SEG International Exposition and 87th Annual Meeting, pp. 6085-6088.
Teledyne Bolt—"Long Life Seismic Source" brochure, 2015, 2 pages.
Teledyne Marine—Teledyne Bolt Model 1500LL Source, technical specifications, date unknown, 1 page.
Widmaier, Martin, et al.—"Recent advances with wide-tow multi-sources in marine seismic streamer acquisition and imaging," First Break, vol. 38, Dec. 2020, pp. 74-79.
Widmaier, Martin, et al.—Redefining marine towed-streamer acquisition, First Break, vol. 37, Nov. 2019, pp. 57-62.
Widmaier, Martin, et al.—"Strategies for High Resolution Towed Streamer Acquisition and Imaging of Shallow Targets," 2017 SEG International Exposition and 87th Annual Meeting, pp. 186-190.
Anonymous, "3-D Binning," as downloaded from https://wiki.seg.org/wiki/3-D_binning (SEG, date unknown).
Examination Report in EP3695252 dated Jun. 15, 2021.
Search Report in GB1720777.0 dated Jun. 13, 2018.
Hager, et al., "Efficient Multi-Source and Multi-Streamer Configuration for Dense Cross-Line Sampling," SEG 2015 New Orleans Annual Meeting (SEG 2015).
International Search Report and Written Opinion in PCT/EP2018/077915 dated Feb. 7, 2019.
Polarcus, "Xarray: Controlled Soundfield Sampling," (Poilarcus, Aug. 2015).
Anonymous, "Sabah MC3D" (PGS, Oct. 2015).
Anonymous, "TopSeis—The Tailor Made Solution for Subsurface Exploration and Development in the Barents Sea," (CGG, Apr. 2017).
Vinje, et al., "Shooting Over the Seismic Spread," First Break, vol. 35, pp. 97-104 (EAGE, Jun. 2017).
Mosher, "Operational Deployment of Compressive Sensing Systems for Seismic Data Acquisition," The Leading Edge, Aug. 2017 (SEG 2017).
Search Report in GB2113622.1 dated Mar. 8, 2022.
Eurasian Search Report in EA 201270372 dated Oct. 22, 2012.
Anonymous, "Principles of Streamer Overlap Shooting," Tech Link, vol. 5, No. 10 (PGS, Oct. 2005).
GB Examination Report in GB2101597.9 dated Aug. 18, 2023.
GB Examination Report in GB2101597.9 dated Nov. 21, 2023.
GB Examination Report in GB2400633.0 dated Jan. 29, 2024.

* cited by examiner

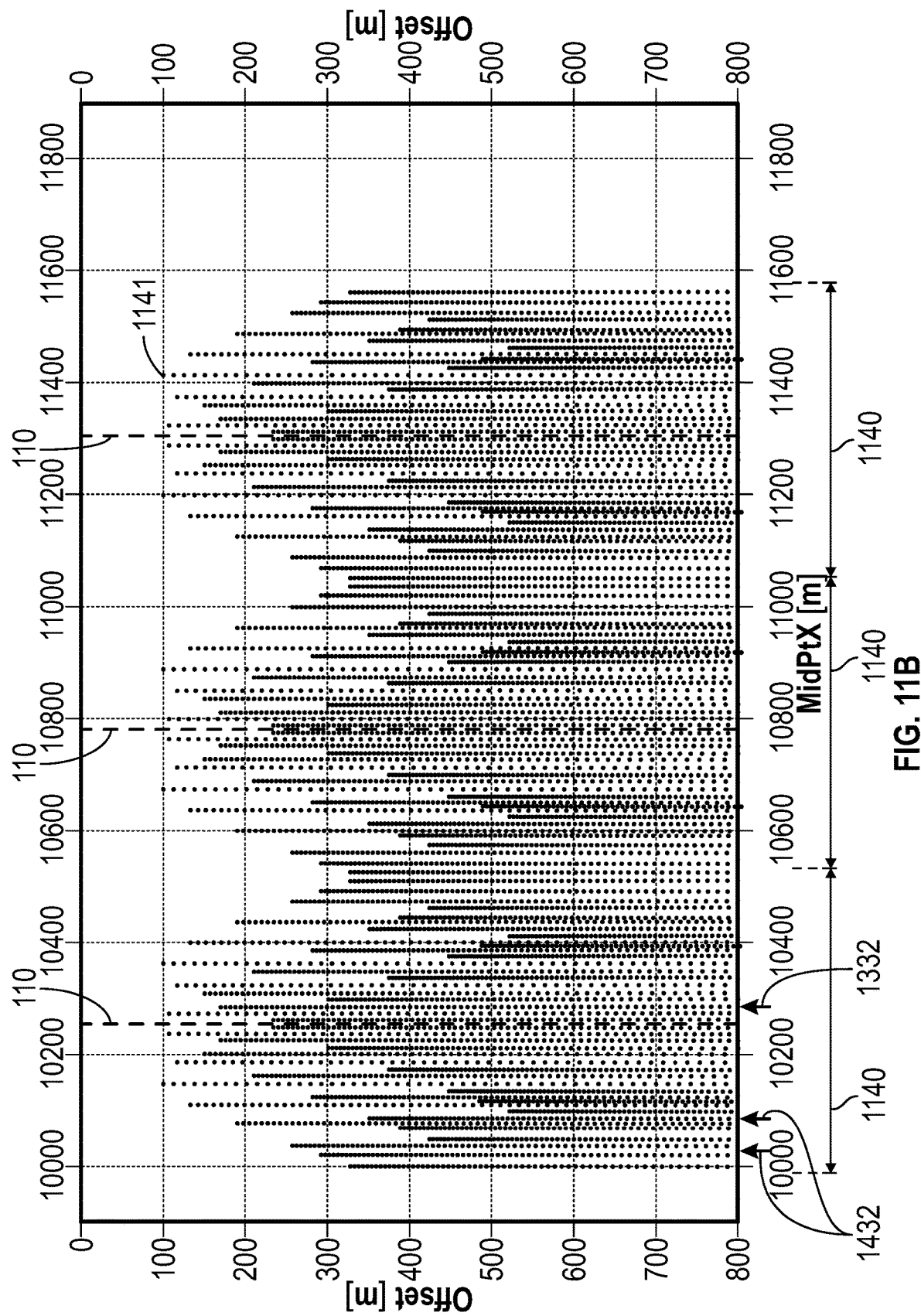

WIDE-TOW SOURCE SURVEYING WITH SUBLINE INFILL

CROSS REFERENCE TO RELATED APPLICATIONS

This application claims benefit of U.S. Provisional Patent Application Ser. No. 62/971,736, filed Feb. 7, 2020, entitled "Wide Efficient Tow Source Surveying," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data (e.g., seismic data, electromagnetic data) which can be useful in the discovery and/or extraction of hydrocarbons from subsurface formations.

There has been increasing use of source configurations having between three and six active sources to improve crossline spatial sampling, rather than traditional dual-source shooting. With only six sub-arrays of air guns available on most seismic vessels, this means that modern source arrays are no longer comprised of three sub-arrays being simultaneously fired. Rather, source configurations are more likely to be built from one or two sub-arrays. One negative consequence of using a higher number of source arrays is that the inline spatial sampling and fold is compromised (in comparison to dual-source shooting), leading to a higher shot record overlap between consecutive shots, and/or routine acquisition of blended data.

A marine survey plan sets out towing paths for the survey vessels. The towing paths may be laid out in parallel sail lines. Since operational costs and risks are directly related to total distance traveled by the survey vessel, fewer sail lines are preferred. The sail line spacing is generally determined both by the width of the streamer spread and the width of the source distribution. A survey plan must include sufficient sail lines, given the source and streamer configurations, to acquire data across the survey area with few or no gaps or missing sublines in the acquired data. For a given streamer spread, and for each sail line, a wider-tow source configuration will typically generate a wider total illumination area, but with a narrower area of sufficiently-dense data. In other words, wide-tow source configurations are known to generate gaps or missing sublines in the acquired data. Heretofore, the remedy has been to increase the sail-line density, leading to an increase in numbers of sail lines and total distance traveled.

It would be beneficial to identify survey configurations allowing for greater sail line separation with consistent data sampling (e.g., having few or no missing sublines).

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 11B illustrates the CMP sublines for three sail lines for the survey configuration of FIG. 11A.

DETAILED DESCRIPTION

Figure 1A:
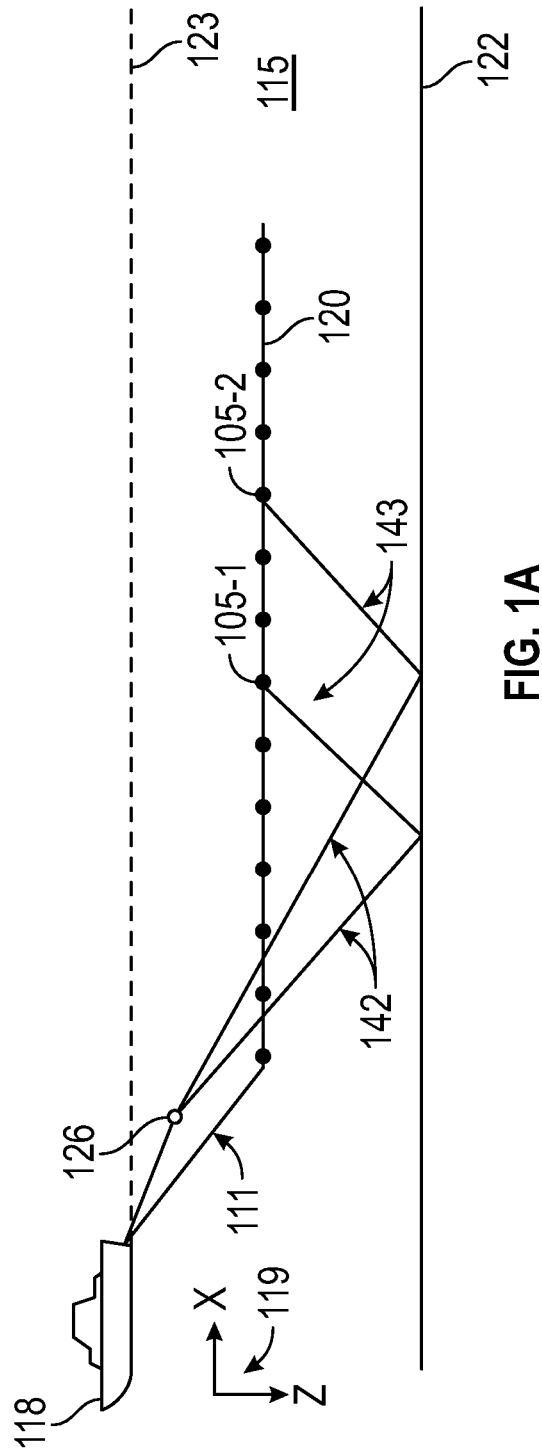
FIG. 1A illustrates an elevation or xz-plane view of an exemplary survey vessel towing a seismic source and a streamer, located in a body of water.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

As used herein, the term "axial" or "axial direction" shall mean, for an object or system having a canonical axis, a direction along a proximal portion of the axis.

As used herein, the term "lateral" or "lateral direction" shall mean, for an object or system having a canonical axis, a direction perpendicular to a proximal portion of the axis. Often, "lateral direction" is understood to be at a fixed depth.

As used herein, the term "inline" or "inline direction" shall mean, for equipment towed by a vessel, a direction along (or parallel to) the path traversed by the vessel.

As used herein, the term "crossline" or "crossline direction" shall mean, for equipment towed by a vessel, a fixed-depth direction perpendicular to the path traversed by the vessel.

As used herein, the term "offset" shall mean the nominal inline distance between the source and the receiver.

As used herein, the term "cable" shall mean a flexible, axial load carrying member that also comprises electrical conductors and/or optical conductors for carrying electrical power and/or signals between components.

As used herein, the term "rope" shall mean a flexible, axial load carrying member that does not include electrical and/or optical conductors. Such a rope may be made from fiber, steel, other high strength material, chain, or combinations of such materials.

As used herein, the term "line" shall mean either a rope or a cable.

As used herein, the term "streamer" shall mean an apparatus (e.g., a cable) that may be towed behind a survey vessel to detect and/or measure geophysical signals (e.g., seismic signals, electromagnetic signals). A streamer may include detectors, sensors, receivers, and/or other structures (e.g., hydrophones, geophones, electrodes) positioned along or within the streamer and configured to detect and/or measure the geophysical signals. Streamers may be towed in arrays, distributed in the crossline direction, and referred to collectively as a "spread" or a "streamer spread."

As used herein, the phrase "regular streamer spread" refers to a streamer spread having uniform nominal crossline streamer separation between each adjacent streamer pair.

As used herein, the term "midline" refers to a centerline of a survey vessel, extending inline behind the survey vessel to the farthest element of the survey (e.g., the tail end of a streamer spread). Typically, for towing efficiency, the sources and/or the streamer spread will be centered on the midline.

As used herein, the term "source vessel" shall mean a watercraft, manned or unmanned, that is configured to carry and/or tow, and in practice does carry and/or tow, one or more geophysical sources. Unless otherwise specified, source vessels should be understood to not carry or tow one or more geophysical streamers.

As used herein, the term "streamer vessel" shall mean a watercraft, manned or unmanned, that is configured to tow, and in practice does carry and/or tow, one or more geophysical streamers. Unless otherwise specified, streamer vessels should be understood to not carry or tow one or more geophysical sources.

As used herein, the term "survey vessel" shall mean a watercraft, manned or unmanned, that is configured to tow, and in practice does carry and/or tow, one or more geophysical sources and/or one or more geophysical streamers.

As used herein, the phrase "wide-tow source configuration" refers to a towing configuration with at least two sources and at least two streamers, where the nominal distance between the midline and the closest source (not on the midline) is greater than the nominal distance between the midline and the closest streamer (not on the midline). Configurations where the nominal distance between the midline and the closest source (not on the midline) is less than or equal to the nominal distance between the midline and the closest streamer (not on the midline) may be generally referred to as "narrow-tow source configurations." In some embodiments the towing configuration may utilize more than one towing vessel (e.g., a source vessel and a streamer vessel).

As used herein, the term "forward" or "front" shall mean the direction or end of an object or system that corresponds to the intended primary direction of travel of the object or system.

As used herein, the terms "aft" or "back" shall mean the direction or end of an object or system that corresponds to the reverse of the intended primary direction of travel of the object or system.

As used herein, the terms "port" and "starboard" shall mean the left and right, respectively, direction or end of an object or system when facing in the intended primary direction of travel of the object or system.

As used herein, the term "survey data" shall mean data utilized by and/or acquired during a survey, including detected signals, seismic data, electromagnetic data, pressure data, particle motion data, particle velocity data, particle acceleration data, clock data, position data, depth data, speed data, temperature data, etc.

As used herein, the term "obtaining" data or information shall mean any method or combination of methods of acquiring, collecting, synthesizing, designing, or accessing data or information, including, for example, directly measuring or sensing a physical property, receiving transmitted data, selecting data from a group of physical sensors, identifying data in a data record, generating data or information manually and/or programmatically, and retrieving data or information from one or more data libraries.

As used herein, the term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic/electromagnetic survey methods and apparatuses, and, at least in some embodiments, to novel source and streamer configurations, and their associated methods of use.

One of the many potential advantages of the embodiments of the present disclosure, is that robust marine survey data may be collected more efficiently than previously, with lower costs and lower operational risks. For example, survey configurations may allow for acquisition of data characterized by populated data bins with traces that, heretofore, would have had minimal, sparse, or nonexistent coverage. More particularly, ultra-near offset data (e.g., data representative of offsets no greater than about 1 km) may be acquired more robustly. Another potential advantage includes improved turnaround efficiency and shortened completion time. Embodiments of the present disclosure can thereby be useful in the discovery and/or extraction of hydrocarbons from subsurface formations.

Figure 1B:
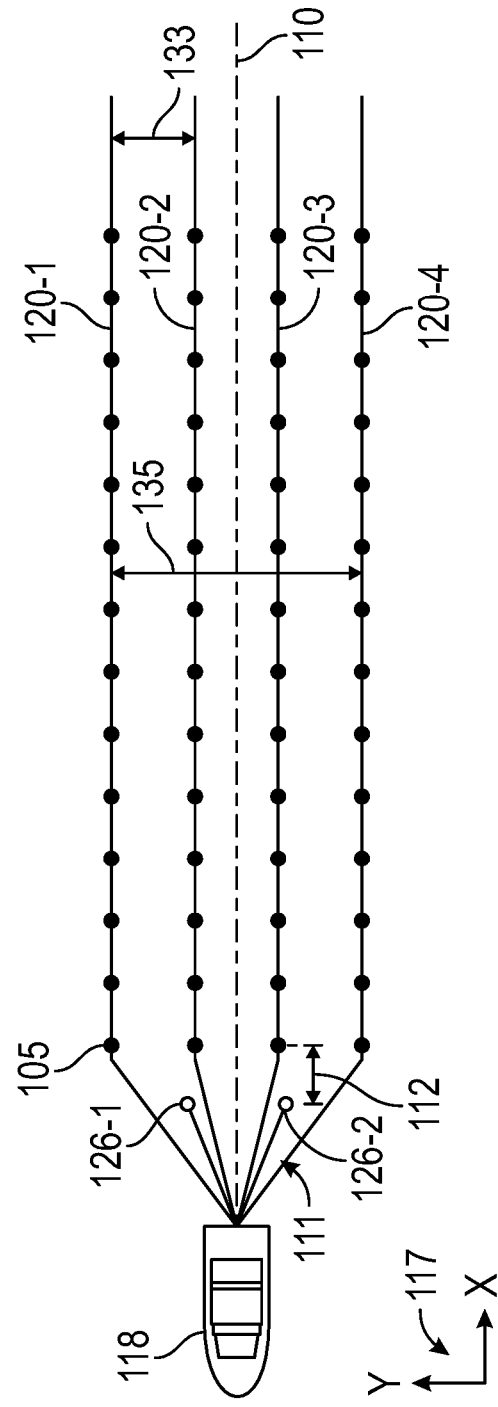
FIG. 1B illustrates a horizontal or xy-plane view of the elements of FIG. 1A.

FIGS. 1A-1B illustrate coordinates and terminology associated with marine surveying according to one or more embodiments of the present disclosure. FIG. 1A illustrates an elevation or xz-plane 119 view of an exemplary survey vessel 118 towing a seismic source 126 and a streamer 120, located in a body of water 115. As illustrated, a lead-in line 111 couples each streamer 120 to the survey vessel 118. FIG. 1B illustrates a horizontal or xy-plane 117 view of the elements of FIG. 1A. FIGS. 1A-1B together illustrate a Cartesian coordinate system used to specify coordinate locations within the body of water 115 and subsurface formation (e.g., below the bottom 122 of the body of water 115) with respect to three orthogonal, spatial coordinate axes labeled x, y and z. The x coordinate uniquely specifies the position of a point in a direction parallel to the path of travel of the survey vessel 118 at a particular point in time, the y coordinate uniquely specifies the position of a point in a direction perpendicular to the x axis and substantially parallel to the surface 123 of the body of water 115 at survey vessel 118, and the z coordinate uniquely specifies the position of a point perpendicular to the xy-plane. The inline separation between elements is measured in the x-direction; the crossline separation between elements is measured in the y-direction, and the depth separation between elements is measured in the z-direction. The total separation can thus be expressed as a function of the three separation components. The surface 123 is the hypothetical surface of the sea level at survey vessel 118 and is used to define zero elevation (i.e., z=0).

In various embodiments, the seismic source 126 can include one or more air guns and/or marine vibrators, among other common seismic source components. Although illustrated as a point, the seismic source 126 may represent a source string or a source array. The seismic source components may be towed at one or more depths and may be suspended from one or more floats at the surface. The source arrays may have any of a variety of spatial configurations. In some embodiments, seismic source 126 may be towed at about 2 m to about 20 m depth, or more particularly about 5 m to about 10 m depth. The survey vessel 118 can include a source controller. For example, the controller can be coupled to the seismic source 126 and configured to control actuation of the seismic source 126 as described herein.

The streamers 120 are typically long (e.g., about 5 km to about 10 km) cables containing power and/or data-transmission lines (e.g., electrical, optical fiber, etc.) to which receivers 105 may be coupled. Receivers 105 may be spaced along each streamer 120. Receivers 105 can include, for instance, seismic receivers configured to detect energy originating from seismic source 126. The nominal inline distance between a particular source 126 and a receiver 105 is referred to as the "offset" of that source-receiver pair. Ultra-near offsets may be about 1 km or less. Near offsets may be about 1 km to about 5 km. Far offsets may be about 5 km to about 10 km. Long offsets may be about 10 km to about 20 km. Very-long offsets may be greater than about 20 km. Each seismic receiver can detect pressure and/or particle motion in the water and/or can be responsive to changes in the pressure and/or particle motion with respect to time. The seismic receivers can include hydrophones, geophones, pressure sensors, particle motion sensors, among other types of seismic sensors, and/or combinations thereof. The streamers 120 and the survey vessel 118 can include sensing electronics, data recording components, and/or data processing facilities that allow marine survey receiver readings to be correlated with absolute positions on the sea surface and absolute three-dimensional positions with respect to the three-dimensional coordinate system (e.g., xz-plane 119 and xy-plane 117). Although FIGS. 1A and 1B illustrate streamers that are parallel to the x-axis, the streamers may diverge somewhat from parallel (for example, streamer fanning may progressively increase the crossline separation between two adjacent streamers as distance from the survey vessel increases).

FIG. 1A includes an illustration of a shot (i.e., actuation of a source 126) and down-going wave routes 142 from the seismic source 126. Energy from seismic source 126 travels into the subsurface formation below the bottom 122 of body of water 115, changing direction due to interaction with rocks, materials, or any reflector (e.g., geological structure) in the subsurface formation. Up-going wave routes 143 represent energy redirected by the subsurface formation towards receivers 105-1 and 105-2.

FIG. 1B illustrates a top or xy-plane 117 view of the survey vessel 118 towing two seismic sources 126-1, 126-2, and four streamers 120-1, 120-2, 120-3, 120-4 located beneath a surface 123 of body of water 115. An array of streamers is referred to as a "streamer spread" or simply "spread." The crossline separation distance between adjacent streamers is referred to as streamer separation 133. In some embodiments, the nominal streamer separation 133 is about 25 m to about 200 m. In the illustrated embodiment, the nominal streamer separation 133 between each adjacent streamer pair is equal (uniform). The four streamers 120-1, 120-2, 120-3, 120-4, having uniform nominal streamer separation between each adjacent streamer pair, thereby comprise a "regular streamer spread." The spread width 135 is the nominal crossline distance from the port-most streamer to the starboard-most streamer. For regular streamer spreads with N streamers, $$\text{spread width} = (N-1) \times \text{streamer separation} \qquad (1)$$

The midline 110 represents the tow path along the centerline of the survey vessel 118, extending behind the survey vessel to the farthest element of the survey, for example the most distal point of the longest streamer 120. When straight-line towing, the nominal path of the streamers 120 (without disturbance by cross currents, etc.) parallels the midline 110. The midline 110 defines y=0. For each sail line of a survey plan, the midline 110 nominally aligns with the sail line.

Embodiments are not limited to a particular number of streamers and can include more or fewer than are shown in FIG. 1B. Some embodiments can, for example, include up to 24 streamers. As illustrated, the streamer spread can be modeled as a planar horizontal acquisition surface located beneath the surface 123 of body of water 115. However in practice, the acquisition surface can be smoothly varying due to active sea currents and/or weather conditions. In other words, the towed streamers may also undulate as a result of dynamic conditions of the fluid. The coordinates of a particular receiver are given by (x, y, z) taking into account both the xz-plane 119 and the xy-plane 117. In some embodiments, the streamer spread may vary in the z direction. For example, streamers may be slanted such that receivers disposed farther from the survey vessel may be deeper than those closer to the survey vessel. Other examples include combination of horizontal and slanted depth profiles, sinusoidal depth profiles, and "snake" depth profiles. Likewise, in some embodiments, one or more of the streamers may be towed at a different depth than other streamers, thereby creating an acquisition volume.

Note the angle of the lead-in lines 111 to the midline 110 in FIG. 1B. It should be appreciated that, for a fixed nearest offset 112, the angle for the outer-most streamers increases as the spread width increases. It should also be appreciated that towing efficiency decreases as the angle increases. Consequently, spread width may be limited by towing capacity. Said another way, in order to increase spread width, towing capacity may dictate an increased nearest offset 112.

Although not illustrated, the survey vessel 118 may include equipment, referred to herein generally as a "recording system", that may provide and/or include navigation control, navigation monitoring, including position determination, seismic source control, seismic source monitoring, receiver control, receiver monitoring, survey data recording, time monitoring, and/or time synchronization between the various control, monitoring, and/or recording components.

Figure 2A:
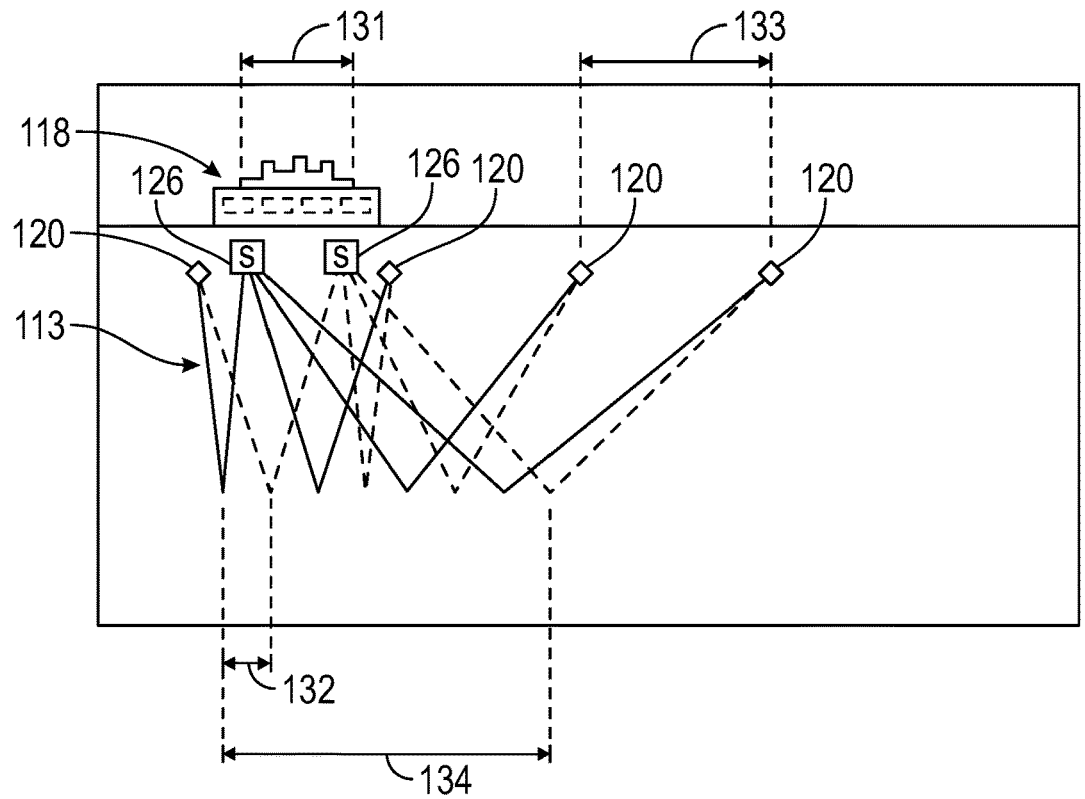
FIG. 2A illustrates a dual-source setup for marine seismic surveying.
Figure 2B:
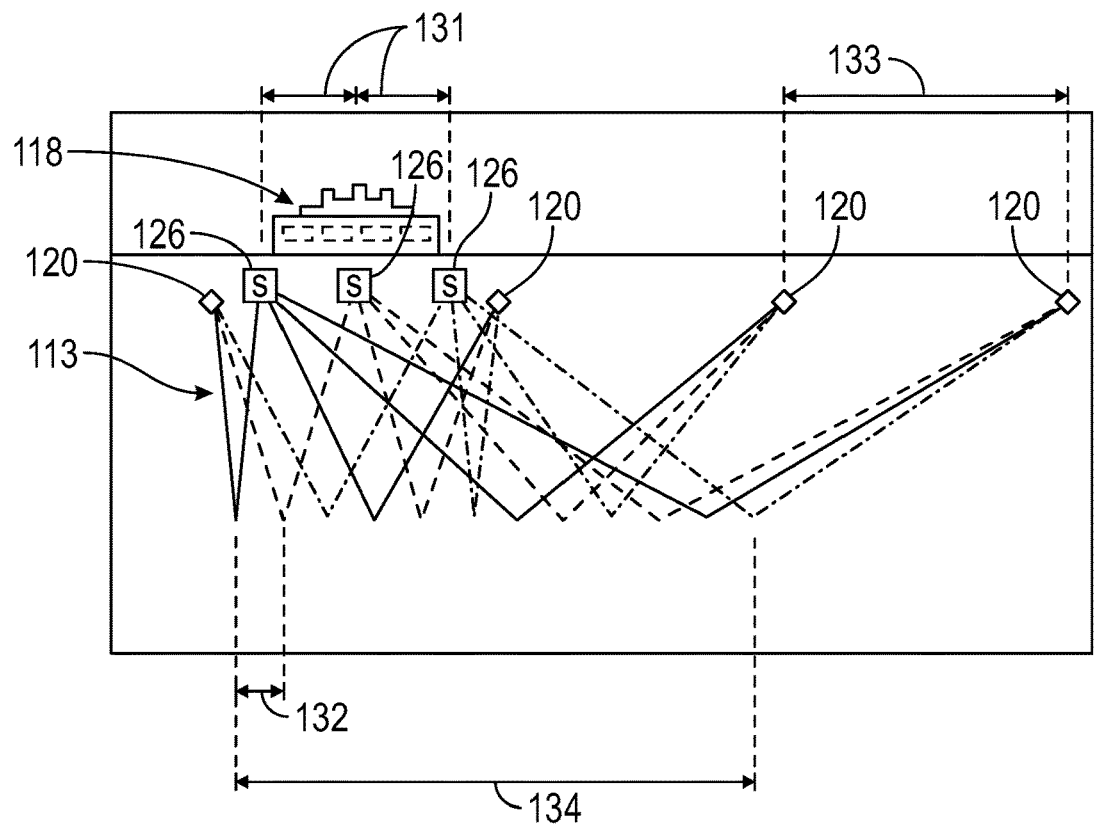
FIG. 2B illustrates a triple-source setup for marine seismic surveying.

Many marine seismic surveys deploy a dual-source setup, as illustrated in FIG. 2A. The dual-source setup has two independently-activated seismic sources 126 towed by a single survey vessel 118 at a crossline source separation 131. Some marine seismic surveys deploy a triple-source setup, as illustrated in FIG. 2B. The triple-source setup has three independently-activated seismic sources 126 towed by a single survey vessel 118 at crossline source separations 131. Although not illustrated, it should be understood that some marine seismic surveys deploy higher numbers of independent sources (e.g., quad-source setup, penta-source setup, hexa-source setup). Each of FIGS. 2A and 2B is a functional diagram, essentially looking from the tail of the streamers 120 (which have receivers thereon) towards the stern of the survey vessels 118. FIGS. 2A and 2B show ray paths 113 between the seismic sources 126 and streamers 120. As illustrated, the dual-source setup and the triple-source setup each have the same crossline source separation 131 (though the triple-source setup has twice that distance between the port-most seismic source and the starboard-most seismic source). As illustrated, the dual-source setup and the triple-source setup each have the same crossline bin width 132. As illustrated, the triple-source setup has a 50% larger streamer separation 133 and crossline subsurface illumination 134 than the dual-source setup. Hence, a triple-source setup can provide greater streamer separation and greater acquisition efficiency. Since the triple-source setup has a larger crossline subsurface illumination, it is expected to utilize fewer sail lines to cover the same acquisition footprint as the dual-source setup. Alternatively, a triple-source setup with the same streamer separation 133 as a dual-source setup would have a narrower crossline bin width 132 (implying denser data sampling). Hence, a triple-source setup can provide better spatial crossline sampling than a dual-source setup, and thereby provide images with improved spatial resolution. Similarly, with narrower crossline bin widths 132, a triple-source setup may have less aliasing noise, and can thereby acquire higher frequency seismic data than a dual-source setup.

Figure 3A:
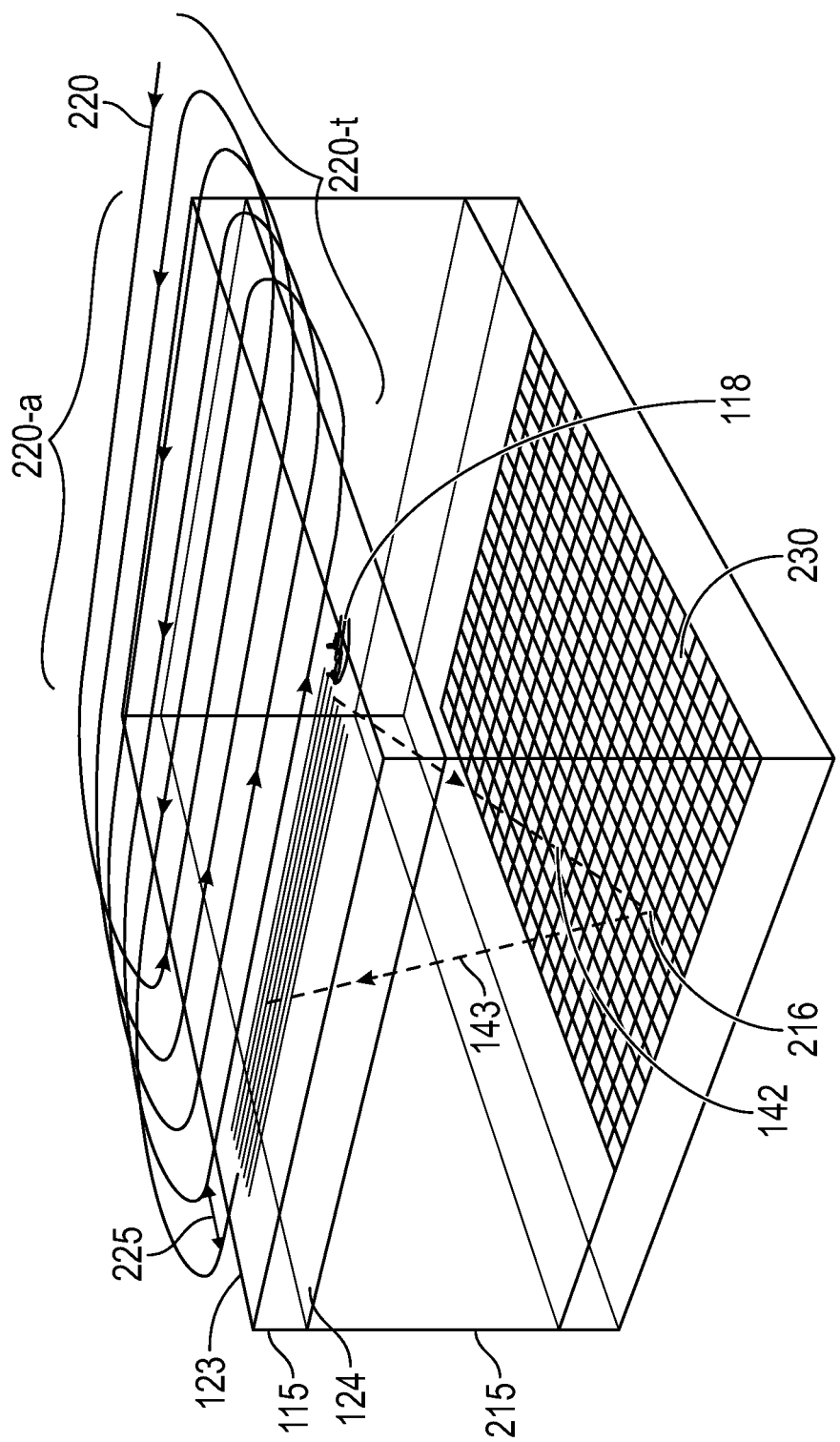
FIG. 3A illustrates a survey vessel conducting a marine survey according to a "race-track" survey design.

FIG. 3A illustrates a survey vessel 118 conducting a marine survey according to a "race-track" survey design. Survey vessel 118 is shown following a path 220. The path 220 includes linear (e.g., nominally straight-line) portions, acquisition paths 220-$a$, wherein survey data acquisition may occur. The path 220 also includes curved portions, turn paths 220-$t$, wherein the survey vessel turns between acquisition paths, and wherein survey data acquisition typically does not occur. Typically, the acquisition paths 220-$a$ would be nominally parallel, and adjacent acquisition paths 220-$a$ would be equally spaced apart throughout the entire survey area. The sail-line separation 225 between adjacent acquisition paths 220-$a$ is related to the spread width and the density of survey data desired. The related parameters may be selected to generate contiguous or "tiled" areas of subsurface illumination. For example, for a survey with a regular streamer spread having N streamers and a uniform nominal sail-line separation:

$$\text{Sail-line separation} = 0.5 \times N \times \text{streamer separation} \quad (2)$$

As illustrated, the survey vessel 118 travels in one direction on four adjacent acquisition paths 220-$a$, and in the opposite direction on the next four adjacent acquisition paths 220-$a$. Each set of adjacent acquisition paths with a common shooting direction is referred to as a "swath".

As would be understood by one of ordinary skill in the art with the benefit of this disclosure, other applicable survey designs provide acquisition paths 220-$a$ that are not linear for example, circular towing and/or spiral towing. In some instances, such survey designs may minimize the time the survey vessel 118 spends not acquiring survey data. For simplicity, the following discussion focuses on straight-line acquisition paths 220-$a$. Common methods for marine surveying and data processing may be used to adapt the following discussion to non-straight-line procedures.

FIG. 3A also illustrates survey vessel 118 traveling through body of water 115 above subsurface formation 215. A seismic source (not shown) towed by survey vessel 118 generates energy that follows one exemplary down-going wave route 142 through body of water 115 and into subsurface formation 215. As illustrated, the energy intersects a reflector 216 in the subsurface formation 215, causing the energy to propagate along up-going wave route 143. Reflector 216 may be, for example, an interface between geological structures. Binning grid 230 is modeled at the depth of reflector 216. Although the subsurface geology is rarely flat, common data processing techniques may model interfaces as flat (uniform depth) for at least a portion of the calculations. Generally, the size of the bins is determined based on the desired resolution of the resulting picture of the subsurface formation 215. By considering all possible wave routes from all available seismic source-receiver pairs, the associated seismic trace from each seismic source-receiver pair may be determined. Typically, each bin of binning grid 230 may contain about 60 traces. The "fold" of a survey refers to the number of traces per bin. A single common midpoint may be determined where the survey data from the receivers may be stacked to maximize the fold. More particularly, the dimensions of each bin are related to the inline receiver separation along the streamers (typically about 12.5 m), and the streamer separation (133 in FIG. 2A). The dimensions of each bin are also related to the number of seismic sources being utilized (e.g., single-source setup, dual-source setup, or triple-source setup). For a survey with a regular streamer spread, the crossline bin width (proximal the midline (e.g., no more than about 10% of the spread width away from the midline)) is given by:

$$\text{Crossline bin width}_{midline} = 0.5 \times \frac{\text{streamer separation}}{\text{number of sources}} \quad (3)$$

Smaller bin width (narrower bins) correspond to higher survey sampling density, and consequently higher resolution of the resulting picture of the subsurface formation 215.

Figure 3B:
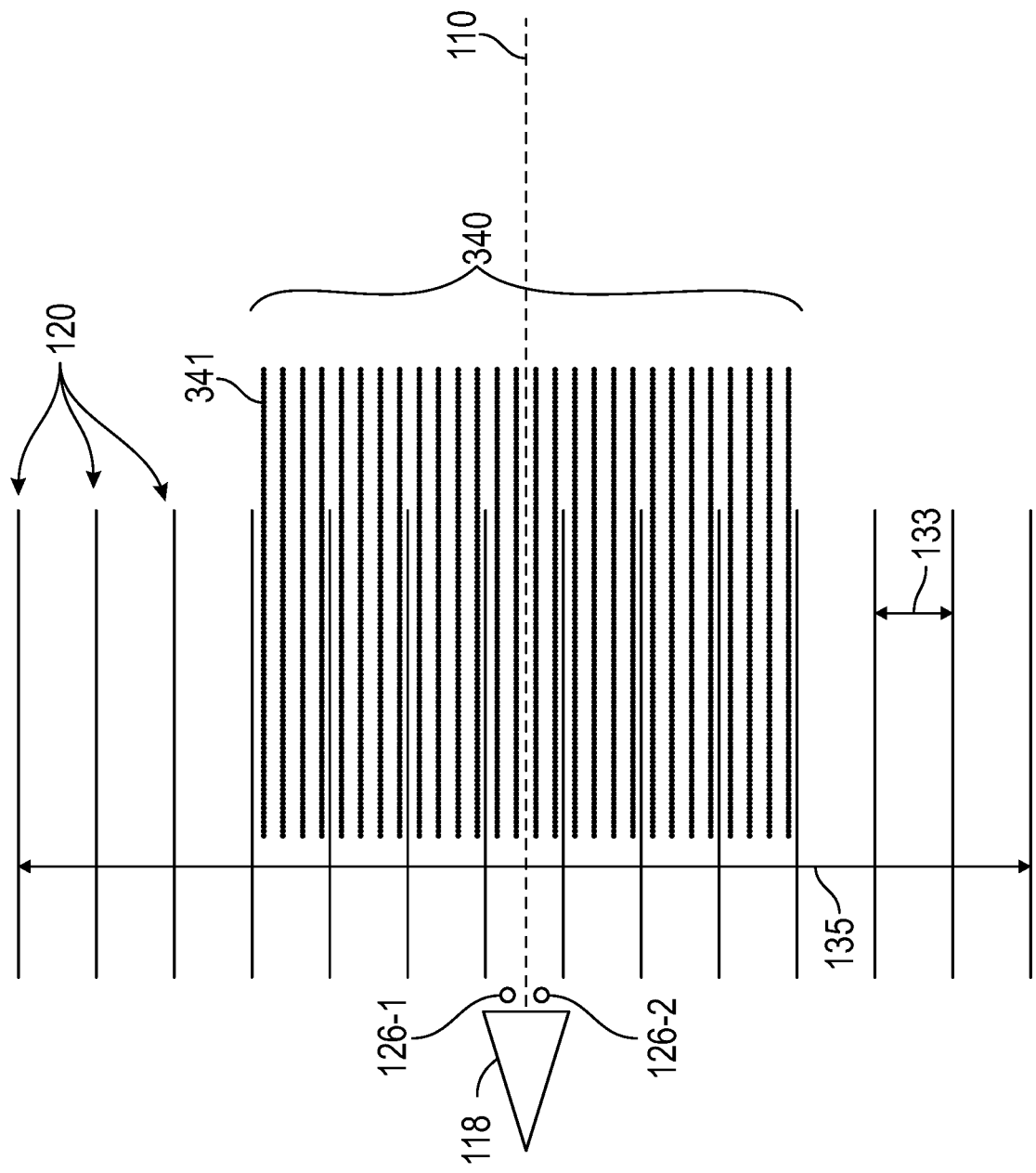
FIG. 3B illustrates a horizontal or xy-plane view of a survey vessel conducting a marine survey, including exemplary Common Midpoint (CMP) sublines.

The center of each bin in binning grid 230 is referred to as the "Common Midpoint" (CMP). Using the flat geology assumption, the location of each subsurface reflection point is at a midpoint between the respective source and receiver coordinates for each wave route. Data detected by receivers (e.g., receivers 105 from FIGS. 1A, 1B) may be identified with bins from binning grid 230 based on the CMP of each datum. Such data may be grouped into sublines of data based on the respective bins, resulting in CMP sublines. Thus, a bin may be said to be "populated" by the respective subline when sufficient data is acquired for the respective CMP. A bin may be said to be "empty" when insufficient data is acquired for the respective CMP. The survey configuration thereby determines predicted (or nominal) CMP sublines 341 (sometimes referred to simply as "sublines"), as illustrated in FIG. 3B. The area where the CMP sublines 341 are uniformly distributed for a given acquisition path 220-a may be referred to as an area or uniform CMP coverage 340. A marine survey may be designed to "tile" areas of uniform CMP coverage from adjacent acquisition paths 220-s so that the entire marine survey area will be uniformly covered.

Figure 4:
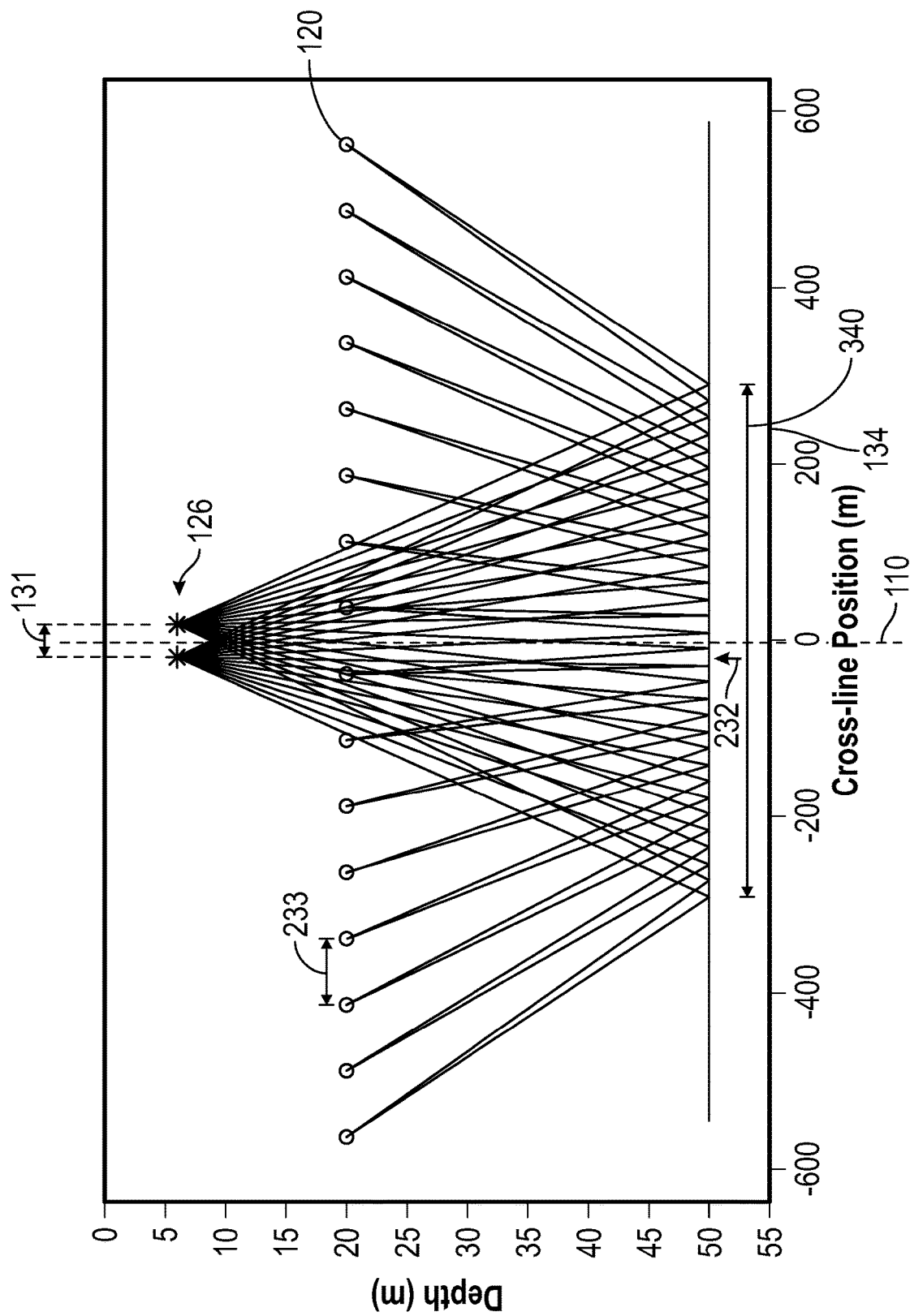
FIG. 4 illustrates crossline bin size and position for an exemplary regular streamer spread survey configuration with dual sources in a narrow-tow configuration.
Figure 5:
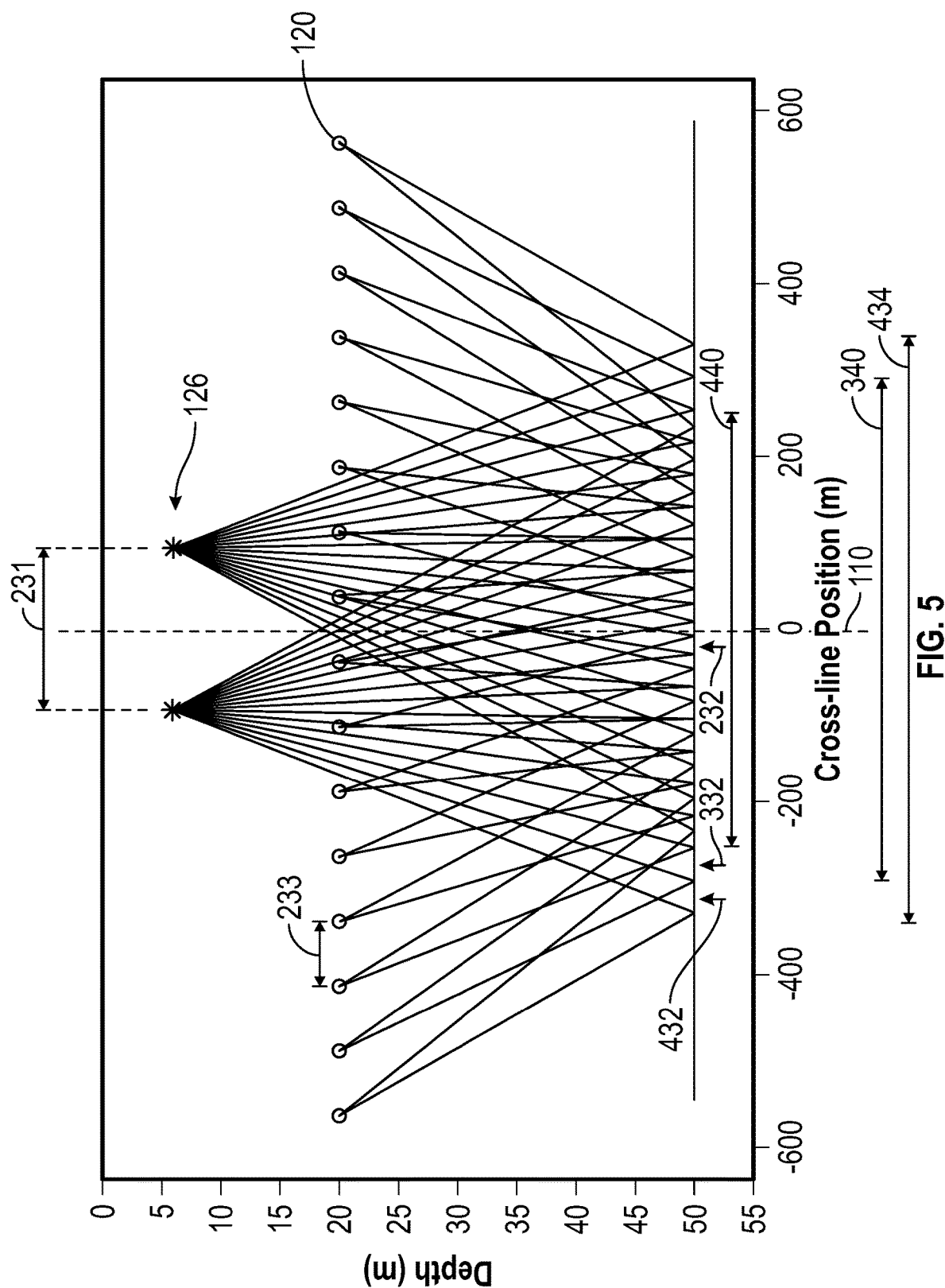
FIG. 5 illustrates crossline bin size and position for the exemplary regular streamer spread configuration of FIG. 4 but with the dual sources in a wide-tow configuration.

FIGS. 4 and 5 present a comparison of a narrow-tow source configuration to a wide-tow source configuration. FIG. 4 illustrates crossline bin size and position for an exemplary regular streamer spread survey configuration with dual sources in a narrow-tow configuration. The illustrated configuration has sixteen streamers 120 equally spaced with a nominal streamer separation 233 of about 75 m at a nominal towing depth of about 20 m. The illustrated configuration has two sources 126 spaced apart by a crossline source separation 131 of about 37.5 m (18.75 m on either side of the midline 110) at a depth of about 6 m. The survey vessel is not shown, but the sail line of the survey vessel may be along the midline 110. According to Equation (2), the sail-line spacing is about 600 m. The area of uniform CMP coverage 340 of the survey area at a depth of about 50 m is about 500 m. In this instance, the area of uniform CMP coverage 340 corresponds to the crossline subsurface illumination 134 (compare to FIGS. 2A, 2B). Note the size and position of bin 232 (within area of uniform CMP coverage 340 and proximal the midline 110). According to Equation (3), the crossline bin width (proximal the midline) is about 18.75 m.

FIG. 5 illustrates crossline bin size and position for the exemplary regular streamer spread configuration of FIG. 4 but with the dual sources in a wide-tow configuration. The illustrated configuration has sixteen streamers 120 equally spaced with a nominal streamer separation 233 of about 75 m at a nominal towing depth of about 20 m. The illustrated configuration has two sources 126 spaced apart by a crossline source separation 231 of about 187.5 m (93.75 m on either side of the midline 110) at a depth of about 6 m. The sail-line spacing remains about 600 m, and the crossline bin width (proximal the midline) remains about 18.75 m. The area of uniform CMP coverage 340 and bin 232 from FIG. 4 are shown on FIG. 5 for comparison. Note that the area of uniform CMP coverage 340 from FIG. 4 is less than the crossline subsurface illumination 434. For example, bin 432 is within the crossline subsurface illumination 434, but outside of the area of uniform CMP coverage 340 from FIG. 4. Note also the width of bin 332, which is within the area of uniform CMP coverage 340 from FIG. 4, in comparison to the width of bin 232. Bin 332 and bin 432 are each about twice as wide as bin 232. Therefore, the area of uniform CMP coverage 440 for FIG. 5 is less than the area of uniform CMP coverage 340 from FIG. 4. This is an expected result of wide-tow source configurations: the crossline subsurface illumination increases, but the area of uniform CMP coverage decreases. Bin 332 and bin 432 can be described as having excessive crossline bin size.

Figure 6A:
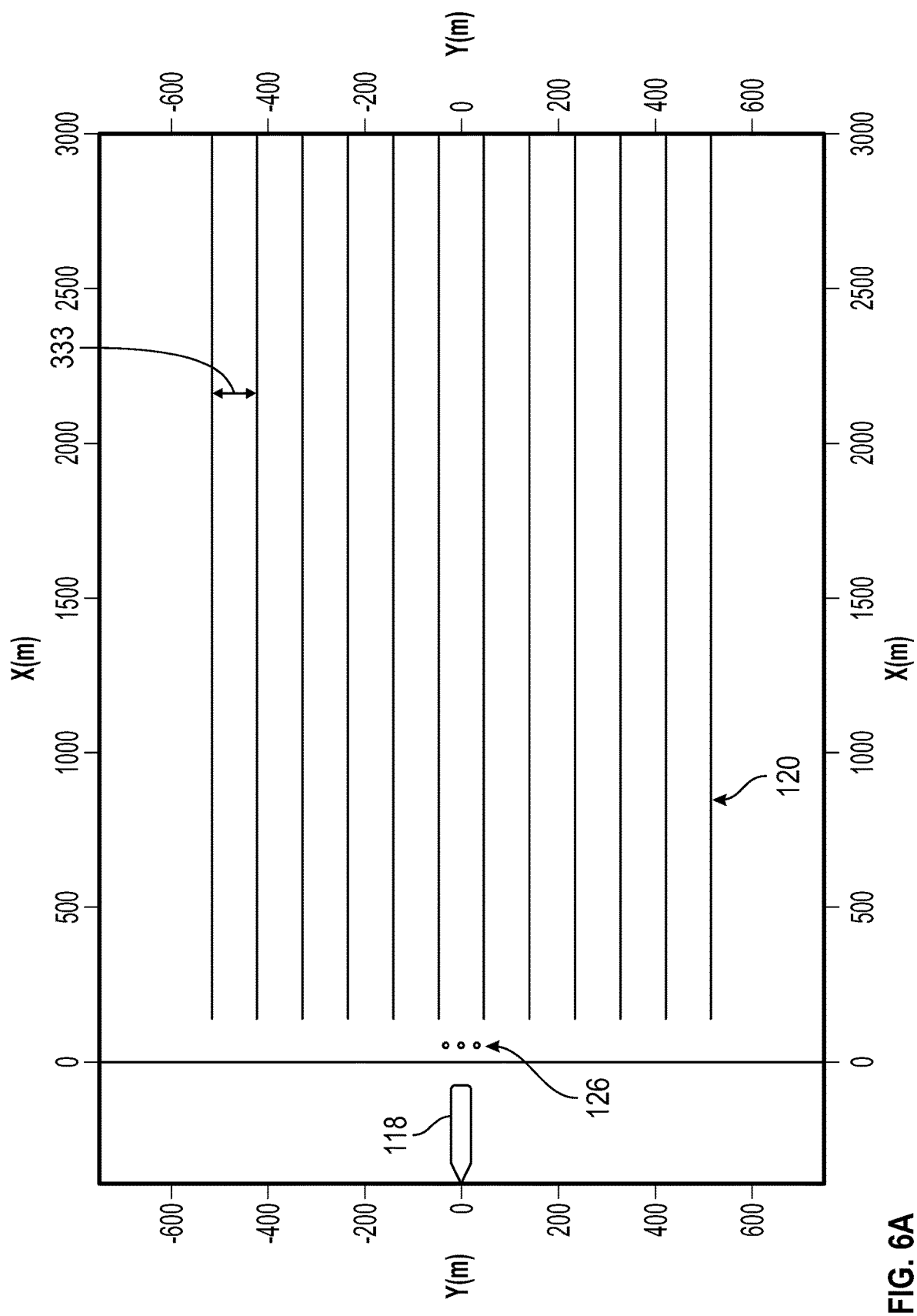
FIG. 6A illustrates an exemplary triple-source, narrow-tow source configuration with a regular streamer spread.

FIGS. 6 and 7 present another comparison of a narrow-tow source configuration to a wide-tow source configuration. FIG. 6A illustrates an exemplary triple-source, narrow-tow source configuration with a regular streamer spread. The illustrated configuration has twelve streamers 120 equally spaced with a nominal streamer separation 333 of about 93.75 m. The illustrated configuration has three sources 126 having a crossline source separation of about 31.25 m.

Figure 6B:
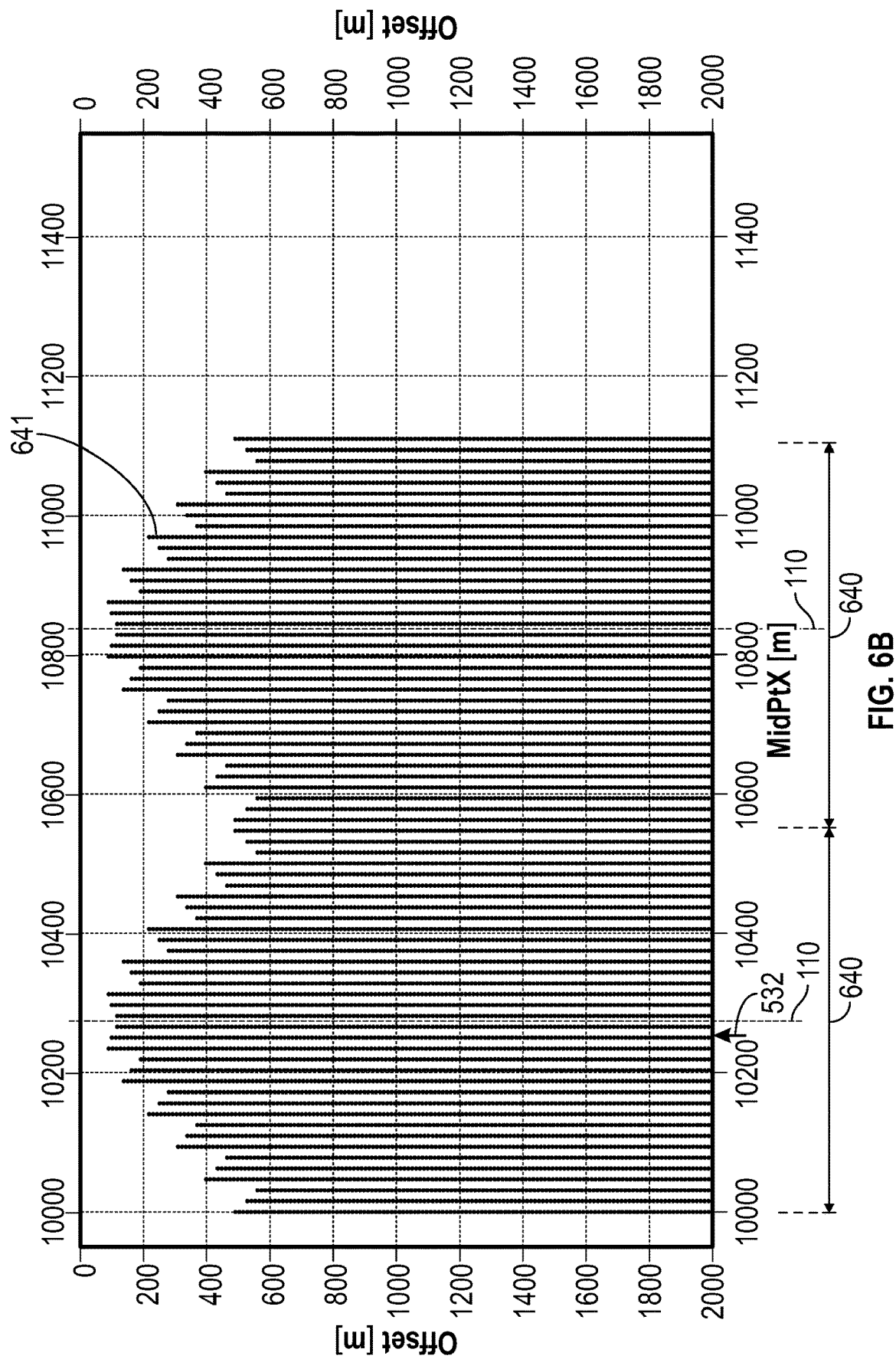
FIG. 6B illustrates the CMP sublines for two sail lines for the survey configuration of FIG. 6A.

FIG. 6B illustrates the CMP sublines 641 for two sail lines (as indicated by midlines 110) for the survey configuration of FIG. 6A. According to Equation (2), sail-line spacing is about 562.5 m. According to Equation (3), the crossline bin width (proximal the midline) is about 15.625 m. For example, bin 532 is expected to have a width of about 15.625 m. Note the two sail lines result in two contiguous areas of uniform CMP coverage 640.

Figure 7A:
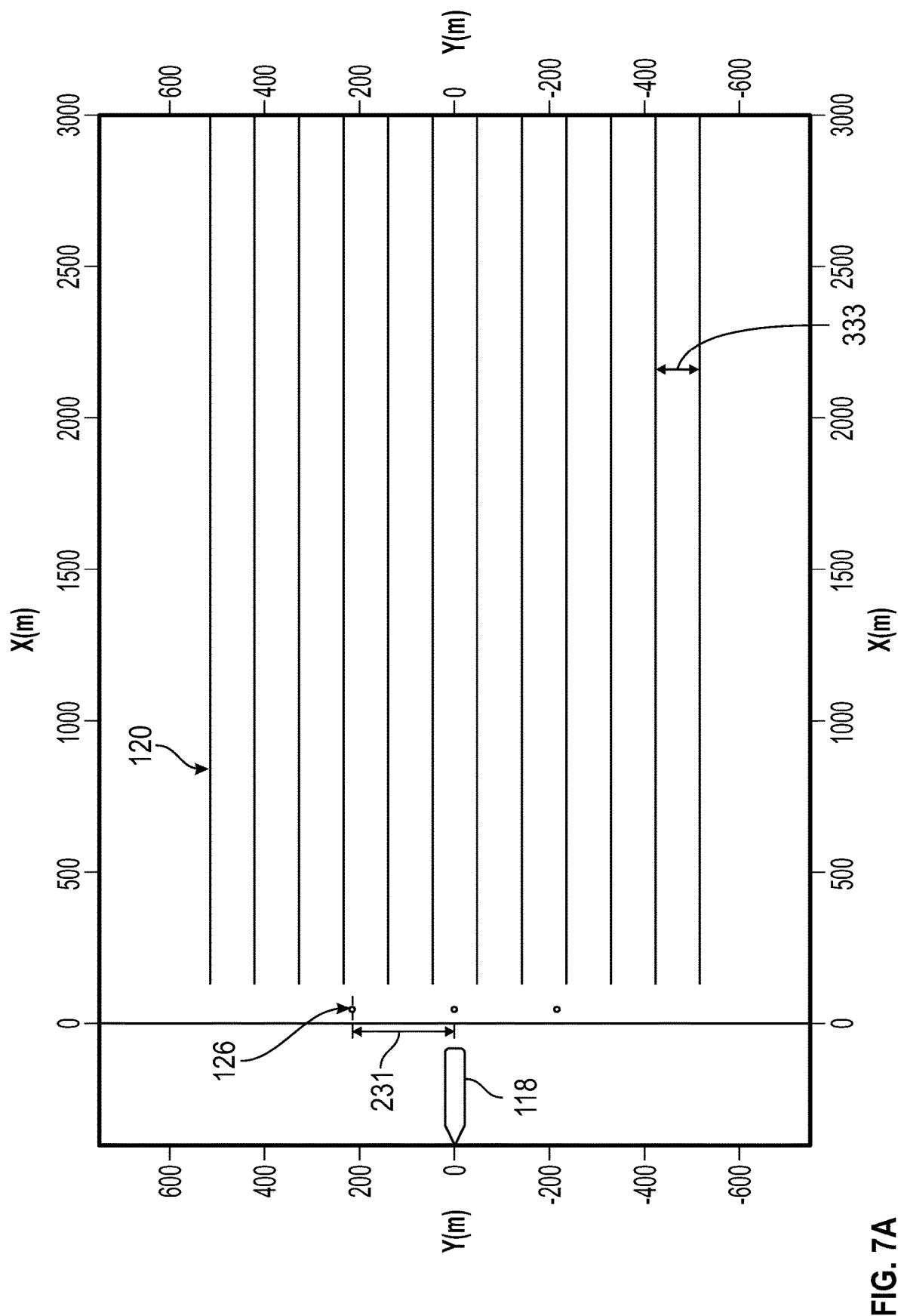
FIG. 7A illustrates an exemplary triple-source, wide-tow source configuration with a regular streamer spread.

FIG. 7A illustrates an exemplary triple-source, wide-tow source configuration with a regular streamer spread. As in FIG. 6A, the illustrated configuration has twelve streamers 120 equally spaced with a nominal streamer separation 333 of about 93.75 m. The illustrated configuration has three sources 126 having a crossline source separation 231 of about 218.75 m.

Figure 7B:
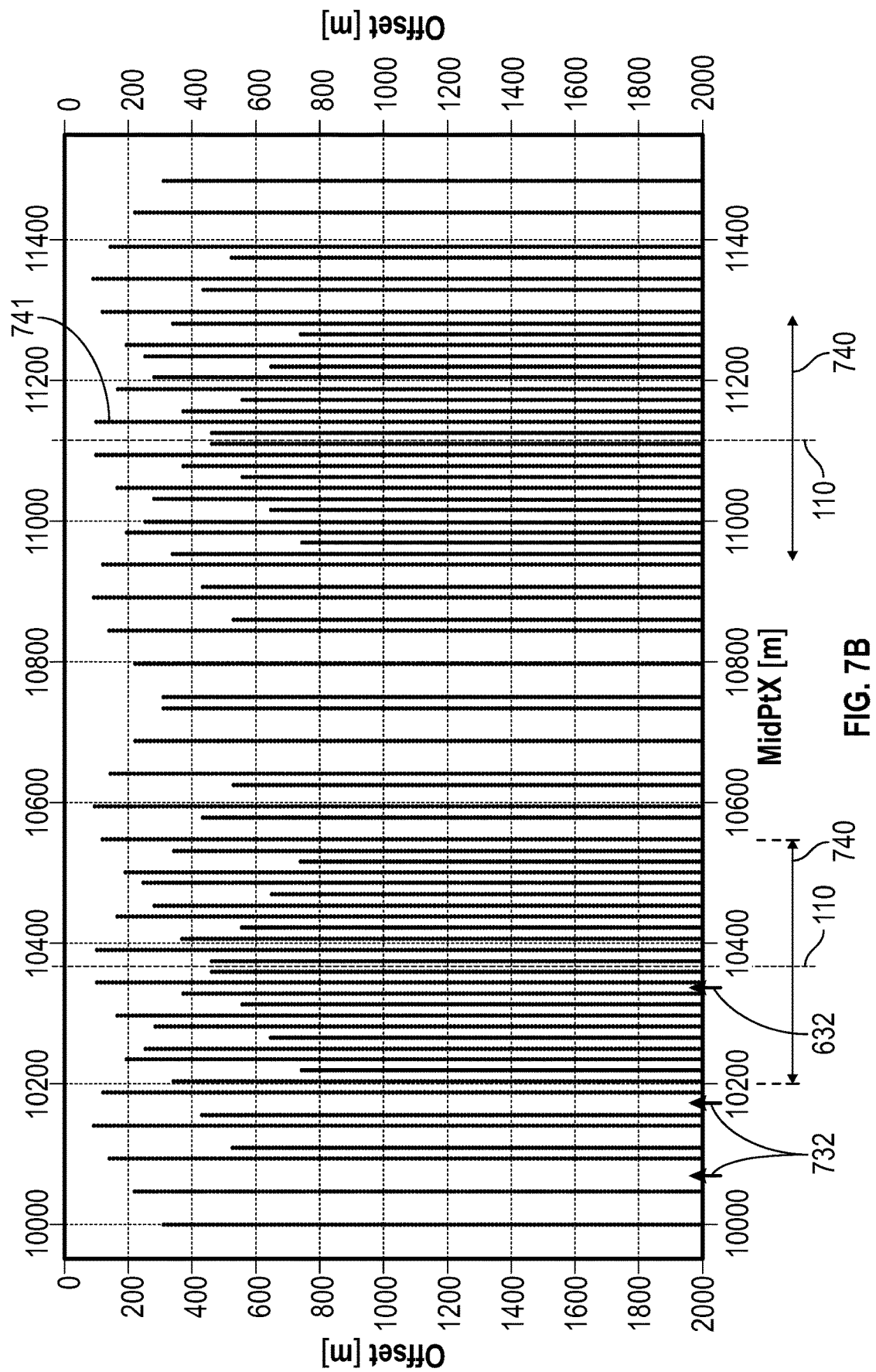
FIG. 7B illustrates the CMP sublines for two sail lines for the survey configuration of FIG. 7A.

FIG. 7B illustrates the CMP sublines 741 for two sail lines (as indicated by midlines 110) for the survey configuration of FIG. 7A. The survey vessel 118 follows a survey path with a sail-line spacing of about 750 m. (This deviates from the sail-line spacing given by Equation (2) for the purposes of comparison to FIG. 8B, as discussed below.) According to Equation (3), the crossline bin width (proximal the midline) remains about 15.625 m. For example, bin 632 is expected to have a width of about 15.625 m. Note the two sail lines result in two discontinuous areas of uniform CMP coverage 740. Note the missing sublines proximal bins 732 and/or outside of the areas of uniform CMP coverage 740. An efficiency estimate for a survey may be related to the sail-line spacing, since fewer sail lines mean less distance traveled, hence reduced expenses and/or operational risk. The efficiency gain of the wide-tow source survey configuration of FIG. 7A over the regular streamer spread configuration of FIG. 6A is 750/562.5-1, or about 33%. However, this efficiency gain is at the cost of missing sublines outside the areas of uniform CMP coverage 740.

Figure 8A:
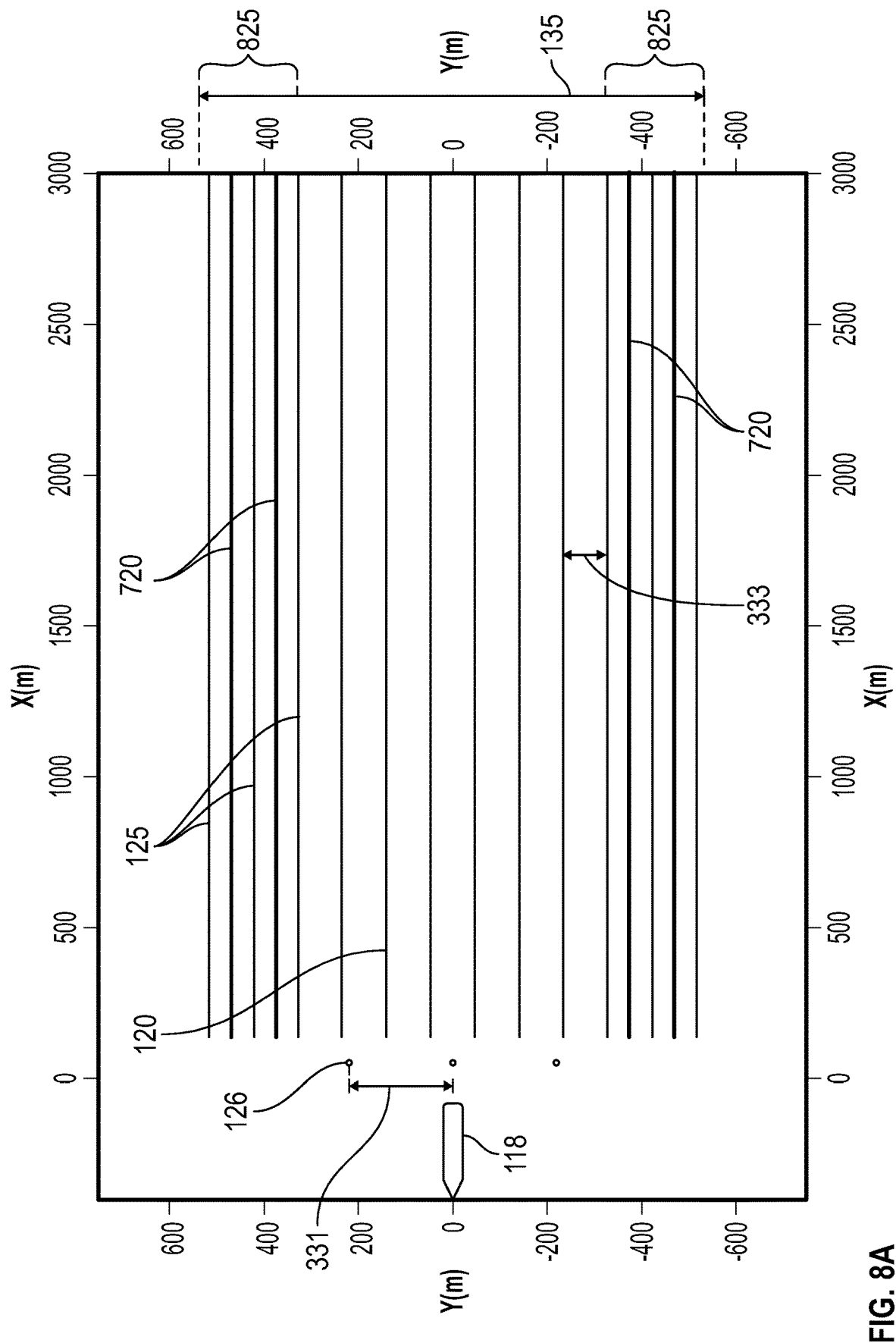
FIG. 8A illustrates an exemplary wide-tow source survey configuration having three sources, a regular streamer spread, and four additional streamers.

FIG. 8A illustrates an exemplary wide-tow source survey configuration having three sources 126. The illustrated configuration has twelve streamers 120 equally spaced with a nominal streamer separation 333 of about 93.75 m. Additionally, the illustrated configuration has four additional streamers 720 interspersed with the outer streamers 125 on either side of the streamer spread. For example, additional streamers 720 may be interspersed in outer regions 825 of the survey spread. As used herein, the "outer region" of a survey spread may be considered an area that is at least about 25% of the spread width 135 away from the midline. Thus, an "outer streamer" may be a streamer that is at least about 25% of the spread width away from the midline. For example, the outer region 825 of the illustrated spread includes three outer streamers 125 on the port side and three outer streamers 125 on the starboard side. As illustrated, each additional streamer 720 is interspersed between two outer streamers 125, and is thus nominally separated by about 46.875 m to each of the nearest outer streamers 125. The illustrated configuration has three sources 126 having a crossline source separation 331 of about 218.75 m. Note that this is the same as the crossline source separation 231 of FIG. 7A.

As illustrated in FIG. 8A, a single additional streamer 720 is interspersed between pairs of adjacent outer streamers 125. This may be referred to herein as "alternatingly interspersed", wherein a single additional streamer 720 is interspersed between a pair of adjacent outer streamers 125. In some embodiments, multiple additional streamers 720 may be interspersed between pairs of adjacent outer streamers 125. In some embodiments, the nominal spacing between streamers 120, outer streamers 125, and/or additional streamers 720 may be non-uniform. In some embodiments, every pair of adjacent outer streamers 125 may be interspersed with one or more additional streamers 720. In some embodiments, one or more pairs of adjacent outer streamers 125 may be interspersed with an additional streamer 720.

For the wide-tow source survey configuration illustrated in FIG. 8A, Equation (2) may be modified as follows:

$$\text{Sail-line separation}=0.5\times(N+n)\times\text{streamer separation} \quad (4)$$

where N represents the number of streamers 120, n represents the number of additional streamers 720, and the streamer separation is the streamer separation 333 between streamers 120 of the regular streamer spread. Moreover, embodiments of wide-tow source survey configurations disclosed herein may have a crossline source separation 331 related to the streamer separation 333 and the number of additional streamers 720 as follows:

$$\text{source separation} = \frac{\text{streamer separation}}{\text{number of sources}} + \frac{n}{2} \times \text{streamer separation} \quad (5)$$

Figure 8B:
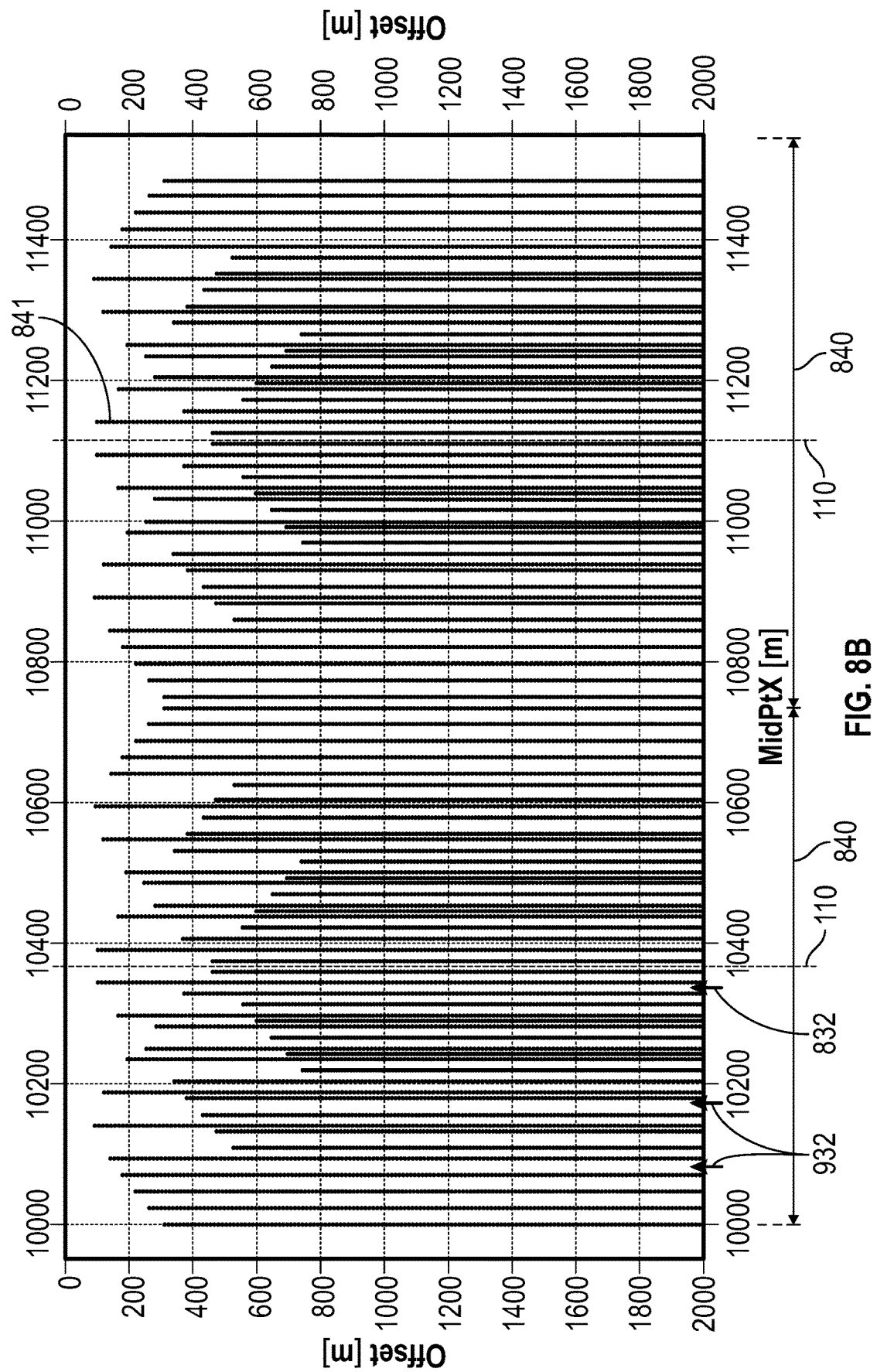
FIG. 8B illustrates the CMP sublines for two sail lines for the survey configuration of FIG. 8A.

FIG. 8B illustrates the CMP sublines 841 for two sail lines (as indicated by midlines 110) for the survey configuration of FIG. 8A. According to Equation (4), and similar to the survey configuration of FIG. 7A, the survey vessel 118 follows a survey path with a sail-line spacing of about 750 m. According to Equation (3), the crossline bin width (proximal the midline) remains about 15.625 m. For example, bin 832 is expected to have a width of about 15.625 m. Rather than areas of uniform CMP coverage 740 as in FIG. 7B, the configuration of 8A generates areas of dense CMP coverage 840. For example, the sparsest subline distribution with the area of dense CMP coverage 840 is no more than twice the crossline bin width provided by Equation (3). In fact, the areas of dense CMP coverage 840 are now contiguous and cover the entire illumination area. There is some non-uniformity in the distribution of sublines in each area of dense CMP coverage 840 (e.g., compare density of sublines proximal bin 832 with density of sublines of bins 932). However, the sublines remain densely populated throughout each area of dense CMP coverage 840 (e.g., compare density of sublines proximal bins 932 with density of sublines proximal bins 732 of FIG. 7B). Thus, the "missing sublines" of FIG. 7B have been "infilled" in FIG. 8B. Note that the improved CMP coverage has been obtained without the use of data interpolation between streamers or "virtual streamer" data constructs. Moreover, the efficiency gain of the wide-tow source survey configuration of FIG. 8A over the regular streamer spread configuration of FIG. 6A is about 33%, and is achieved without generating missing sublines as with the survey configuration of FIG. 7A.

In some embodiments, the sources 126, streamers 120, and streamers 720 are towed by a single survey vessel. In some embodiments, multiple vessels are utilized to tow the sources 126, streamers 120, and streamers 720. For example, one or more of the streamers 720 may be towed by a remotely-operated vehicle. As another example, a source vessel may tow sources 126, while a streamer vessel (or vessels) may tow streamers 120 and/or streamers 720.

Figure 9A:
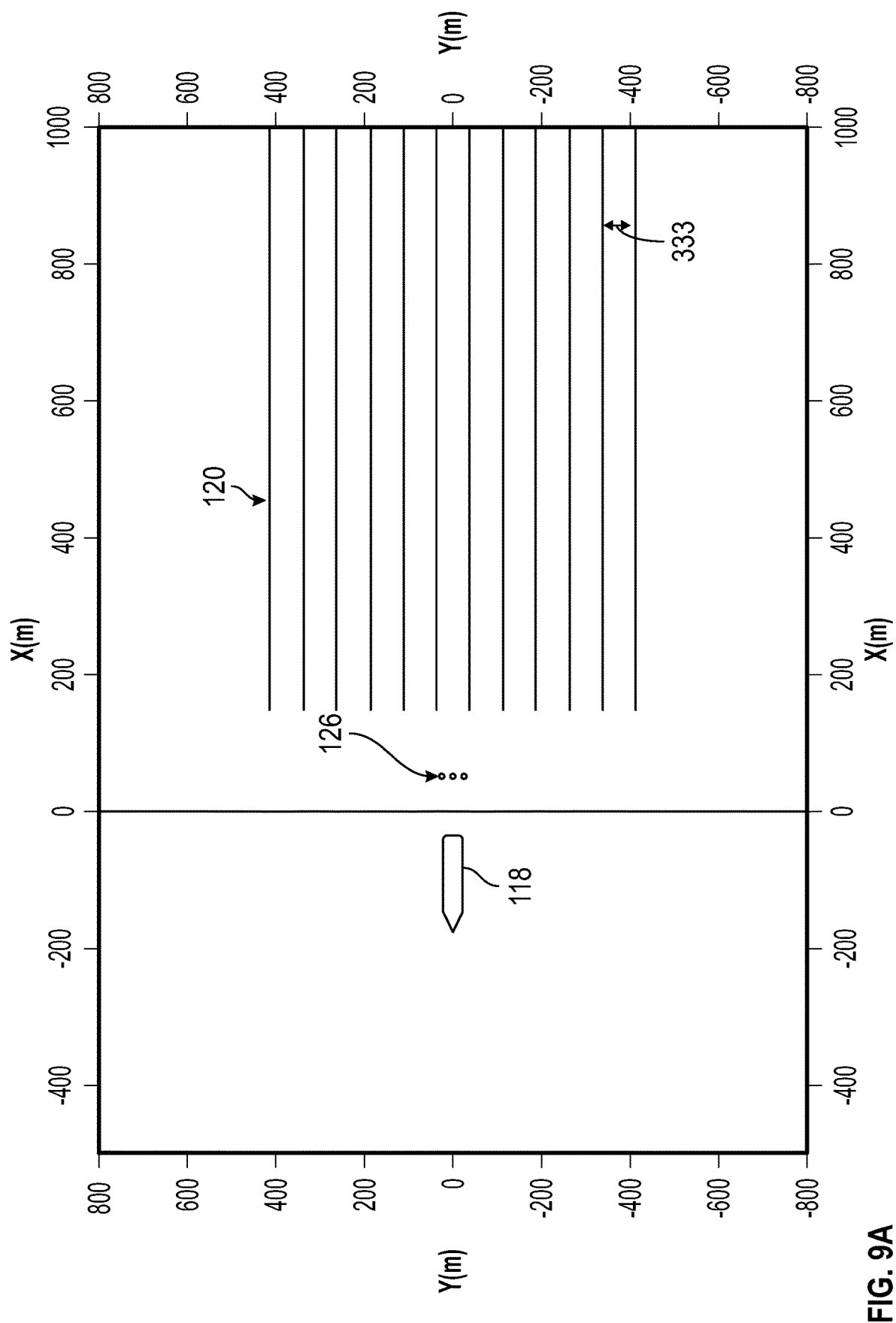
FIG. 9A illustrates another exemplary triple-source, narrow-tow source configuration with a regular streamer spread.

FIGS. 9 and 10 present another comparison of a narrow-tow source configuration to a wide-tow source configuration. FIG. 9A illustrates another exemplary triple-source, narrow-tow source configuration with a regular streamer spread. The illustrated configuration has twelve streamers 120 equally spaced with a nominal streamer separation 333 of about 75 m. The illustrated configuration has three sources 126 having a crossline source separation of about 25 m.

Figure 9B:
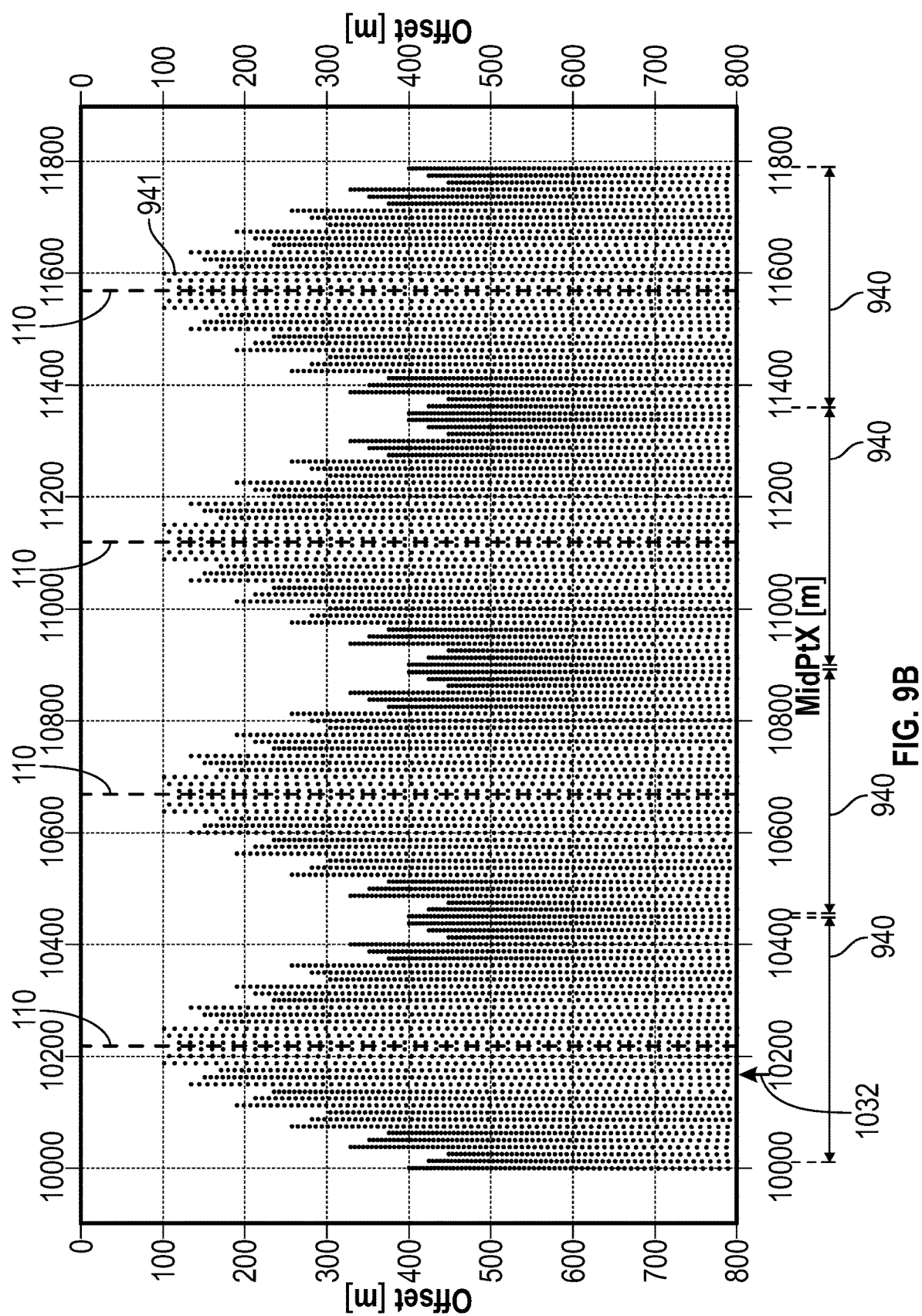
FIG. 9B illustrates the CMP sublines for four sail lines for the survey configuration of FIG. 9A.

FIG. 9B illustrates the CMP sublines 941 for four sail lines (as indicated by midlines 110) for the survey configuration of FIG. 9A. According to Equation (2), sail-line spacing is about 450 m. According to Equation (3), the crossline bin width (proximal the midline) is about 12.5 m. For example, bin 1032 is expected to have a width of about 12.5 m. Note the four sail lines result in four contiguous areas of uniform CMP coverage 940.

Figure 10A:
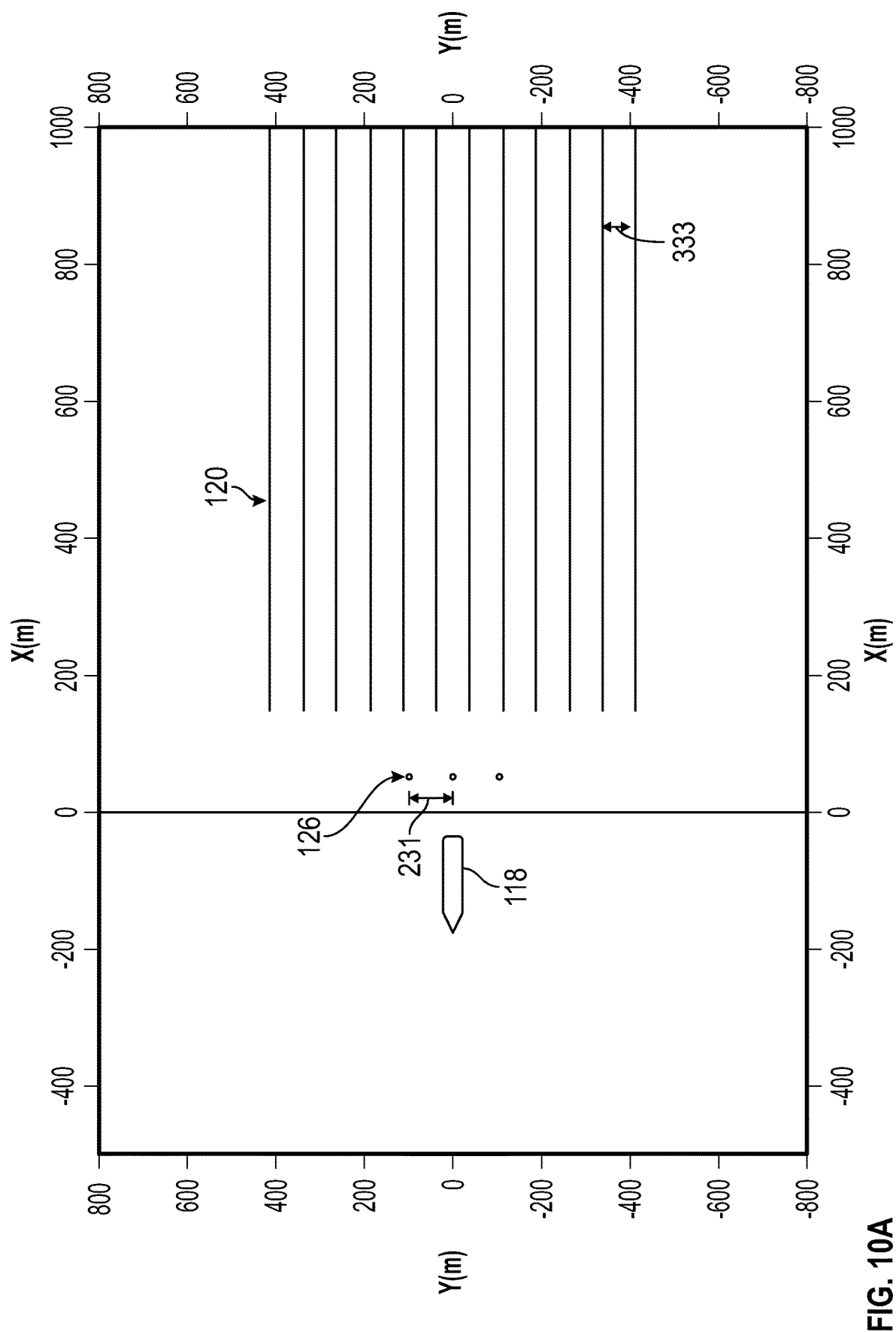
FIG. 10A illustrates another exemplary triple-source, wide-tow source configuration with a regular streamer spread.

FIG. 10A illustrates another exemplary triple-source, wide-tow source configuration with a regular streamer spread. As in FIG. 9A, the illustrated configuration has twelve streamers 120 equally spaced with a nominal streamer separation 333 of about 75 m. The illustrated configuration has three sources 126 having a crossline source separation 231 of about 100 m.

Figure 10B:
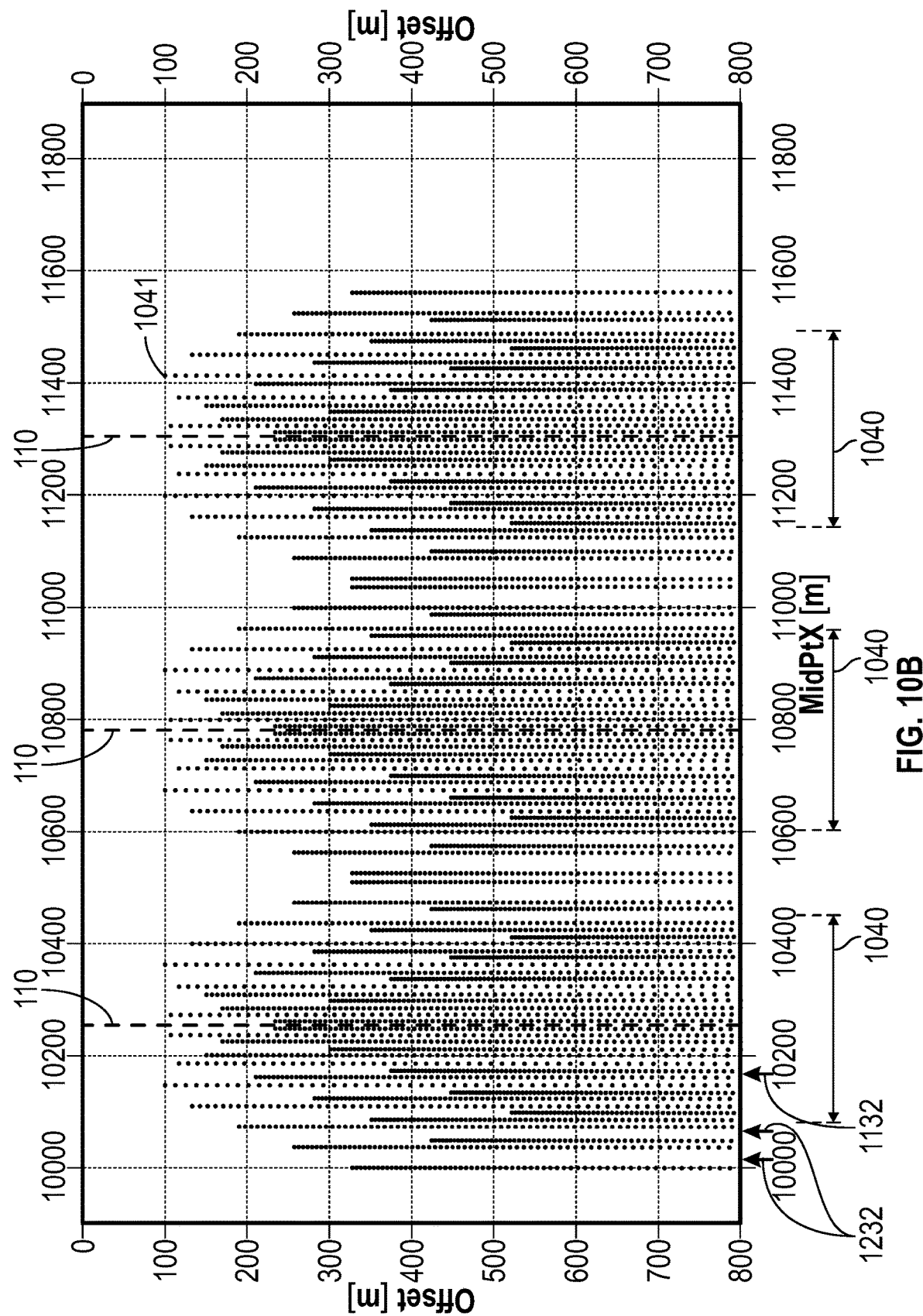
FIG. 10B illustrates the CMP sublines for three sail lines for the survey configuration of FIG. 10A.

FIG. 10B illustrates the CMP sublines 1041 for three sail lines (as indicated by midlines 110) for the survey configuration of FIG. 10A. The survey vessel 118 follows a survey path with a sail-line spacing of about 525 m. (This deviates from the sail-line spacing given by Equation (2) for the purposes of comparison to FIG. 11B, as discussed below.) According to Equation (3), the crossline bin width (proximal the midline) remains about 12.5 m. For example, bin 1132 is expected to have a width of about 12.5 m. Note the three sail lines result in three discontinuous areas of uniform CMP coverage 1040. Note the missing sublines proximal bins 1232 and/or outside of the areas of uniform CMP coverage 1040.

Figure 11A:
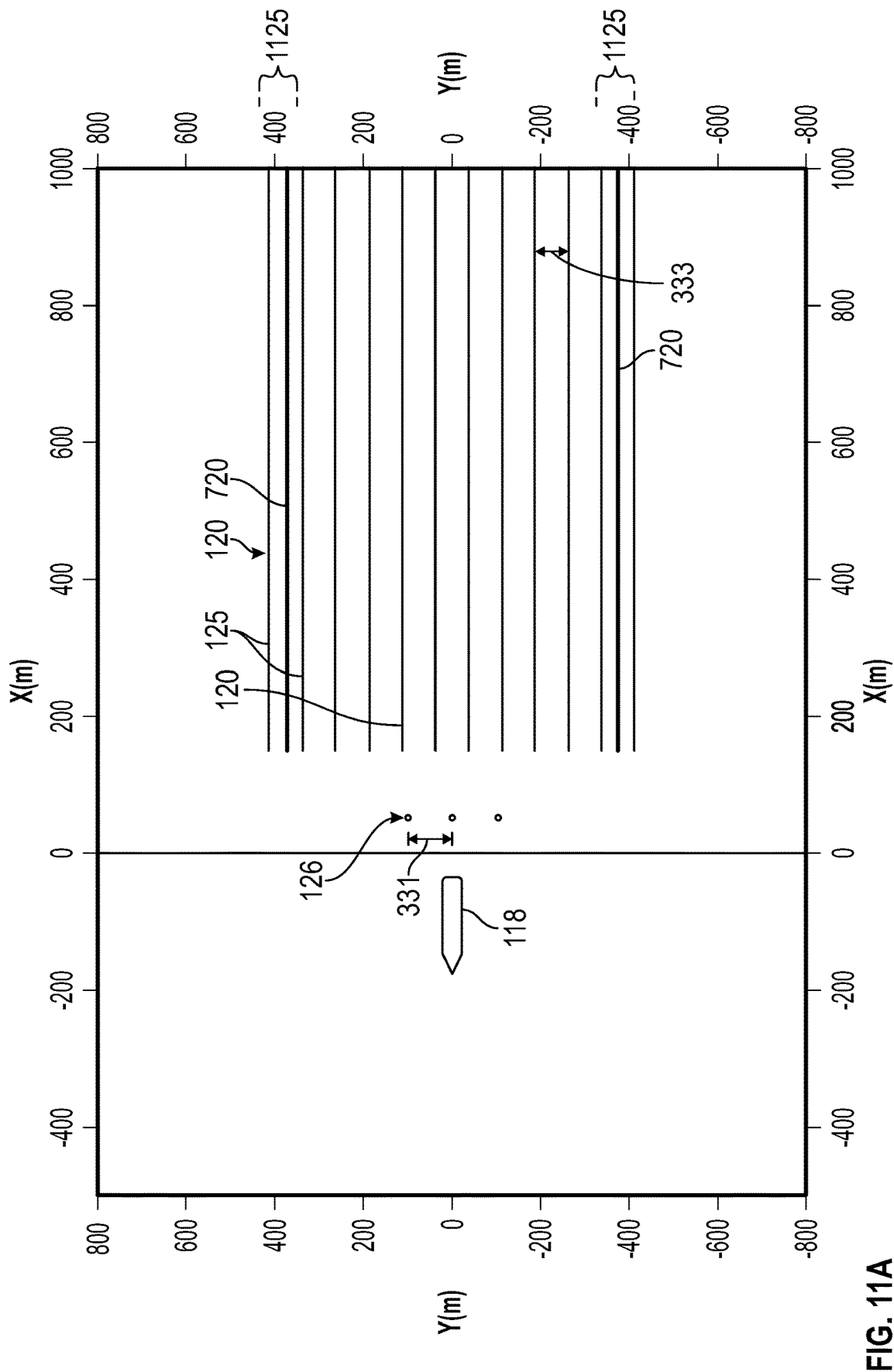
FIG. 11A illustrates an exemplary wide-tow source survey configuration having three sources, a regular streamer spread, and two additional streamers.

FIG. 11A illustrates another exemplary wide-tow source survey configuration having three sources 126. The illustrated configuration has twelve streamers 120 equally spaced with a nominal streamer separation 333 of about 75 m. Additionally, the illustrated configuration has two additional streamers 720 interspersed with the outer streamers 125 on either side of the streamer spread. For example, additional streamers 720 may be interspersed in outer regions 1125 of the survey spread. For example, the outer region 1125 of the illustrated spread includes two outer streamers 125 on the port side and two outer streamers 125 on the starboard side (the outer-most streamer and the penultimate outer-most streamer on each side). As illustrated, each additional streamer 720 is interspersed between two outer streamers 125, and is thus nominally separated by about 37.5 m to each of the nearest outer streamers 125. The illustrated configuration has three sources 126 having a crossline source separation 331 of about 100 m. Note that this is the same as the crossline source separation 231 of FIG. 10A and as would be given by Equation (5).

FIG. 11B illustrates the CMP sublines 1141 for three sail lines (as indicated by midlines 110) for the survey configuration of FIG. 11A. According to Equation (4), and similar to the survey configuration of FIG. 10A, the survey vessel 118 follows a survey path with a sail-line spacing of about 525 m. According to Equation (3), the crossline bin width (proximal the midline) remains about 12.5 m. For example, bin 1332 is expected to have a width of about 12.5 m. As in FIG. 8B, the configuration of 11A generates contiguous areas of dense CMP coverage 1140 that cover the entire illumination area. For example, the sparsest subline distribution with the area of dense CMP coverage 1140 is no more than twice the crossline bin width provided by Equation (3). There is some non-uniformity in the distribution of sublines in each area of dense CMP coverage 1140 (e.g., compare density of sublines proximal bin 1332 with density of sublines of bins 1432). However, the sublines remain densely populated throughout each area of dense CMP coverage 1140 (e.g., compare density of sublines proximal bins 1432 with density of sublines proximal bins 1232 of FIG. 10B). Thus, the "missing sublines" of FIG. 10B have been infilled in FIG. 11B. Note that the improved CMP coverage has been obtained without the use of data interpolation between streamers or "virtual streamer" data constructs. Moreover, the efficiency gain of the wide-tow source survey configuration of FIG. 11A over the regular streamer spread configuration of FIG. 9A is about is 525/450-1, or about 17%, and is achieved without generating missing sublines as with the survey configuration of FIG. 10A.

As illustrated in FIG. 8A, four additional streamers 720 are alternatingly interspersed between pairs of adjacent outer streamers 125 of the streamer spread. As illustrated in FIG. 11A, two additional streamers 720 are alternatingly interspersed between pairs of adjacent outer streamers 125 of the streamer spread. In other embodiments, other numbers (e.g. six or eight) of additional streamers 720 may be alternatingly interspersed between pairs of adjacent outer streamers 125. In some embodiments, one or more pairs of adjacent outer streamers 125 are not interspersed with additional streamers 720.

Figure 12:
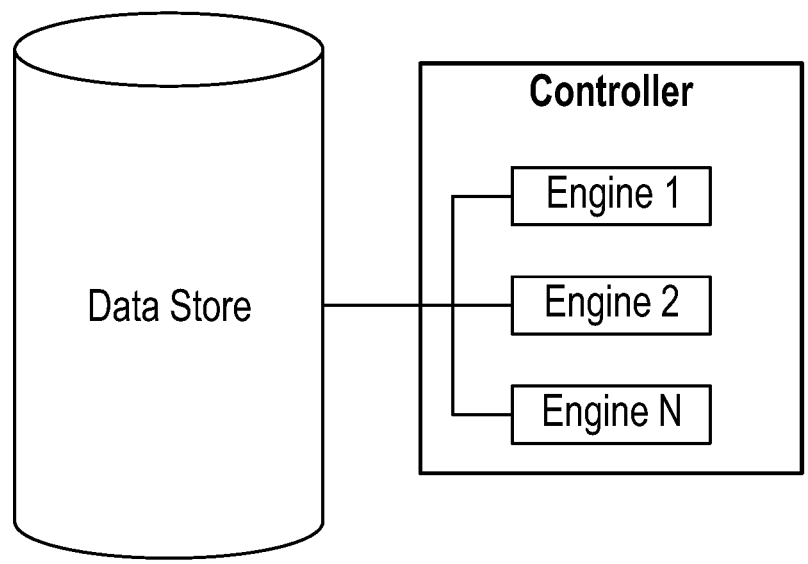
FIG. 12 illustrates an exemplary system for a wide-tow source surveying with subline infill.

FIG. 12 illustrates an exemplary system for a wide-tow source surveying with subline infill. The system can include a data store and a controller coupled to the data store. The controller can be analogous to the controller described with respect to FIG. 1. The data store can store marine seismic survey data.

The controller can include a number of engines (e.g., engine 1, engine 2, . . . engine N) and can be in communication with the data store via a communication link. The system can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller can be configured, for example, via a combination of hardware and program instructions in the number of engines for a wide-tow source survey with subline infill method. For example, a first engine (e.g., engine 1) can be configured to actuate sources, process data, and/or acquire data gathered during acquisition using a wide-tow source survey with subline infill configuration and method.

Figure 13:
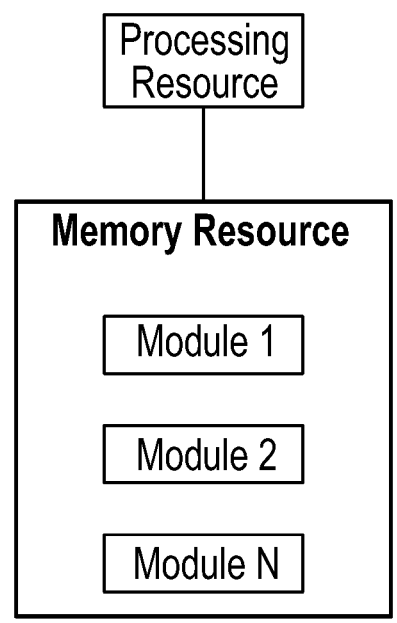
FIG. 13 illustrates an exemplary machine for a wide-tow source survey with subline infill method.

FIG. 13 illustrates an exemplary machine for a wide-tow source survey with subline infill method. In at least one embodiment, the machine can be analogous to the system illustrated in FIG. 12. The machine can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the machine in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store information, such as various types of dynamic random-access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local to or remote from the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Although not specifically illustrated in FIG. 13, the memory resources can store marine seismic survey data. As is shown in FIG. 13, the machine-readable instructions stored in the memory resources can be segmented into a number of modules (e.g., module 1, module 2, ... module N) that when executed by the processing resources can perform a number of functions. As used herein a module includes a set of instructions included to perform a particular task or action. The number of modules can be sub-modules of other modules. For example, module 1 can be a sub-module of module 2. Furthermore, the number of modules can comprise individual modules separate and distinct from one another. Examples are not limited to the specific modules illustrated in FIG. 13.

In at least one embodiment of the present disclosure, a first module (e.g., module 1) can include program instructions and/or a combination of hardware and program instructions that, when executed by a processing resource, can actuate sources, process data, and/or acquire data gathered during acquisition using a wide-tow source survey with subline infill configuration and method.

The methods and systems described herein may be used to manufacture a geophysical data product indicative of certain properties of a subterranean formation. The geophysical data product may include geophysical data such as seismic data, electromagnetic data, pressure data, particle motion data, particle velocity data, particle acceleration data, CMP subline infill data, and any seismic image that results from using the methods and systems described above. The geophysical data product may be stored on a tangible and/or non-transitory computer-readable media. The geophysical data product may be produced offshore (i.e., by equipment on the survey vessel) or onshore (i.e., at a computing facility on land) either within the United States or in another country. When the geophysical data product is produced offshore or in another country, it may be imported onshore to a data-storage facility in the United States. For example, the geophysical data product may be transmitted onshore, and/or the tangible and/or non-transitory computer-readable media may be brought onshore. Once onshore in the United States, geophysical analysis may be performed on the geophysical data product. For example, the tangible and/or non-transitory computer-readable media may be accessed onshore to generate and/or analyze CMP subline infill data.

In an embodiment, a method includes towing a plurality of sources in a wide-tow source survey configuration along a first sail line; actuating at least one of the plurality of sources to create a signal; detecting the signal with a first receiver on a first streamer of a first plurality of streamers; and detecting the signal with a second receiver on a second streamer of a second plurality of streamers, wherein: the first plurality of streamers comprises a port outer region and a starboard outer region, and the second plurality of streamers are interspersed with streamers from the first plurality of streamers in the port outer region and in the starboard outer region.

In one or more embodiments disclosed herein, the first plurality of streamers comprises a regular streamer spread.

In one or more embodiments disclosed herein, the regular streamer spread comprises at least twelve streamers that are towed at a streamer separation of at least 75 m.

In one or more embodiments disclosed herein, each of the port outer region and the starboard outer region of the first plurality of streamers comprises three streamers from the first plurality of streamers.

In one or more embodiments disclosed herein, each of the port outer region and the starboard outer region of the first plurality of streamers comprises two streamers from the first plurality of streamers.

In one or more embodiments disclosed herein, for each pair of adjacent streamers from the first plurality of streamers in the port outer region and in the starboard outer region, exactly one streamer from the second plurality of streamers is interspersed.

In one or more embodiments disclosed herein, a method includes towing the plurality of sources and the first plurality of streamers with a survey vessel.

In one or more embodiments disclosed herein, a method includes towing the second plurality of streamers with the survey vessel.

In one or more embodiments disclosed herein, a method includes towing the plurality of sources along a second sail line, wherein: the first sail line and the second sail line are adjacent sail lines of a survey, the first plurality of streamers comprises N streamers with S streamer separation between adjacent streamers, the second plurality of streamers comprises n streamers, and a separation between the first sail line and the second sail line is at least $((N+n) \times S)/2$.

In one or more embodiments disclosed herein, the plurality of sources comprises K sources, a crossline bin width W equals $S/(2 \times K)$, and the method further comprises acquiring data with a CMP subline spacing over the illumination area that is at least as dense as 1 per W.

In one or more embodiments disclosed herein, the plurality of sources are towed at a crossline source separation of at least $(1/K+n/2) \times S$.

In one or more embodiments disclosed herein, the first sail line and the second sail line are linear.

In one or more embodiments disclosed herein, the plurality of sources comprises two sources that are towed at a crossline source separation of at least 100 m.

In one or more embodiments disclosed herein, the plurality of sources comprises three sources that are towed at a crossline source separation of at least 50 m.

In one or more embodiments disclosed herein, each of an offset of the first receiver and an offset of the second receiver is less than 1 km.

In one or more embodiments disclosed herein, a method includes recording data related to the detected signal; and storing the data on one or more non-transitory, tangible computer-readable media.

In one or more embodiments disclosed herein, a method includes accessing the computer-readable media onshore; and performing geophysical analysis onshore on the image.

In an embodiment, a method includes towing a first plurality of streamers, a second plurality of streamers, and a plurality of sources along a first sail line; towing the first plurality of streamers, the second plurality of streamers, and the plurality of sources along a second sail line, wherein: the first sail line and the second sail line are adjacent sail lines of a survey, the plurality of sources are in a wide-tow source survey configuration, the plurality of sources comprises K sources, the first plurality of streamers comprises N streamers with S streamer separation between adjacent streamers, the second plurality of streamers comprises n streamers, a separation between the first sail line and the second sail line is greater than $((N+n) \times S)/2$, and a crossline bin width W equals S/(2×K); and acquiring data with a CMP subline spacing over the illumination area that is at least as dense as 1 per W.

In one or more embodiments disclosed herein, a method includes actuating at least one of the plurality of sources to create a signal; detecting the signal with a first receiver on a first streamer of a first plurality of streamers; and detecting the signal with a second receiver on a second streamer of the second plurality of streamers, wherein: the first plurality of streamers comprises a port outer region and a starboard outer region, and the second plurality of streamers are interspersed with streamers from the first plurality of streamers in the port outer region and in the starboard outer region.

In one or more embodiments disclosed herein, each of the port outer region and the starboard outer region is defined by an outer-most streamer and a penultimate outer-most streamer.

In one or more embodiments disclosed herein, a crossline separation between a streamer of the second plurality of streamers and each nearest streamer from the first plurality of streamers is S/2.

In one or more embodiments disclosed herein, each of an offset of the first receiver and an offset of the second receiver is less than 1 km.

In one or more embodiments disclosed herein, a method includes recording data related to the detected signal; and storing the data on one or more non-transitory, tangible computer-readable media.

In one or more embodiments disclosed herein, a method includes accessing the computer-readable media onshore; and performing geophysical analysis onshore on the image.

In one or more embodiments disclosed herein, a method includes towing the plurality of sources, the first plurality of streamers, and the second plurality of streamers with a survey vessel.

In one or more embodiments disclosed herein, the first plurality of streamers comprises a regular streamer spread.

In one or more embodiments disclosed herein, N≥12, and S≥75 m.

In one or more embodiments disclosed herein, the first sail line and the second sail line are linear.

In an embodiment, a system includes a survey vessel; a plurality of sources in a wide-tow source survey configuration and coupled to the survey vessel; a first plurality of streamers comprising a regular streamer spread and coupled to the survey vessel; and a second plurality of streamers coupled to the survey vessel, wherein: the first plurality of streamers comprises a port outer region and a starboard outer region, and the second plurality of streamers are interspersed with streamers from the first plurality of streamers in the port outer region and in the starboard outer region.

In one or more embodiments disclosed herein, the plurality of sources comprises two sources having a crossline source separation of at least 100 m.

In one or more embodiments disclosed herein, the plurality of sources comprises three sources having a crossline source separation of at least 50 m.

In one or more embodiments disclosed herein, the first plurality of streamers comprises at least twelve streamers having a streamer separation of at least 75 m.

In one or more embodiments disclosed herein, each of the port outer region and the starboard outer region is defined by an outer-most streamer and a penultimate outer-most streamer.

In one or more embodiments disclosed herein, wherein the first plurality of streamers comprises N streamers with S streamer separation between adjacent streamers.

In one or more embodiments disclosed herein, a crossline separation between a streamer of the second plurality of streamers and each nearest streamer from the first plurality of streamers is S/2.

In one or more embodiments disclosed herein, each of an offset of the first receiver and an offset of the second receiver is less than 1 km.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
    towing a plurality of sources in a wide-tow source configuration along a first sail line;
    actuating at least one of the plurality of sources to create a signal;
    detecting the signal with a first receiver on a first streamer of a first plurality of streamers;
    detecting the signal with a second receiver on a second streamer of a second plurality of streamers; and
    towing the plurality of sources along a second sail line adjacent to the first sail line, wherein:
    the first plurality of streamers comprises a regular streamer spread having a spread width from a port-most streamer to a starboard-most streamer;
    the regular streamer spread has a midline centered between the port-most streamer and the starboard-most streamer;
    the first plurality of streamers comprises a port outer region that is at least 25% of the spread width away from the midline towards port, and a starboard outer region that is at least 25% of the spread width away from the midline towards starboard;
    the second plurality of streamers consists of streamers that are interspersed with streamers from the first plurality of streamers in the port outer region and in the starboard outer region;
    the plurality of sources are towed at a crossline source separation of at least $(1/K+n/2)\times S$ in which K corresponds to the number of sources in the plurality of sources, S corresponds to the separation distance between adjacent streamers in the first plurality of streamers, and n corresponds to the number of streamers in the second plurality of streamers; and
    a separation distance between the first sail line and the second sail line is at least $((N+n)\times S)/2$ in which N corresponds to the number of streamers in the first plurality of streamers.

2. The method of claim 1, wherein:
    the regular streamer spread comprises at least twelve streamers that are towed at a streamer separation of at least 75 m.

3. The method of claim 1, wherein each of the port outer region and the starboard outer region of the first plurality of streamers comprises two or three streamers from the first plurality of streamers.

4. The method of claim 1, wherein, for each pair of adjacent streamers from the first plurality of streamers in the port outer region and in the starboard outer region, exactly one streamer from the second plurality of streamers is interspersed.

5. The method of claim 1, further comprising:
    towing the plurality of sources and the first plurality of streamers with a survey vessel; and towing the second plurality of streamers with the survey vessel.

6. The method of claim 1, wherein the plurality of sources comprises one of:
two sources that are towed at a crossline source separation of at least 100 m; and
three sources that are towed at a crossline source separation of at least 50 m.

7. The method of claim 1, wherein each of an offset of the first receiver and an offset of the second receiver is less than 1 km.

8. The method of claim 1, further comprising:
recording data related to the detected signal; and
storing the data on one or more non-transitory, tangible computer-readable media, thereby completing the manufacture of a geophysical data product.

9. The method of claim 1, wherein the second plurality of streamers consists of two streamers.

10. The method of claim 1, wherein the second plurality of streamers consists of four streamers.

11. The method of claim 1, wherein at least one of the streamers in the second plurality of streamers has a same length as at least one of the streamers in the first plurality of streamers.

12. The method of claim 1, wherein only a single streamer in the second plurality of streamers is disposed between any two adjacent streamers in the first plurality of streamers.

13. The method of claim 12, wherein the streamers in the second plurality of streamers are interspersed with the streamers in the first plurality of streamers in an alternating fashion.

14. The method of claim 13, wherein the alternating begins with crossline outermost ones of the streamers in the first plurality of streamers.

15. The method of claim 1, wherein:
no streamers are interspersed with streamers from the first plurality of streamers between the port outer region and the starboard outer region.

16. A method, comprising:
towing a plurality of sources in a wide-tow source survey configuration along a first sail line;
actuating at least one of the plurality of sources to create a signal;
detecting the signal with a first receiver on a first streamer of a first plurality of streamers;
detecting the signal with a second receiver on a second streamer of a second plurality of streamers, wherein:
the first plurality of streamers comprises a port outer region and a starboard outer region, and
the second plurality of streamers are interspersed with streamers from the first plurality of streamers in the port outer region and in the starboard outer region; and
towing the plurality of sources along a second sail line, wherein:
the first sail line and the second sail line are adjacent sail lines of a survey, the first plurality of streamers comprises N streamers with S streamer separation between adjacent streamers,
the second plurality of streamers comprises n streamers, and
a separation between the first sail line and the second sail line is at least $((N+n) \times S)/2$.

17. The method of claim 16, wherein:
the plurality of sources comprises K sources,
a crossline bin width W equals $S/(2 \times K)$, and
the method further comprises acquiring data with a CMP subline spacing over the illumination area that is at least as dense as 1 per W.

18. The method of claim 17, wherein the plurality of sources are towed at a crossline source separation of at least $(1/K+n/2) \times S$.

19. The method of claim 16, wherein the plurality of sources are towed at a crossline source separation of at least $(1/K+n/2) \times S$.

20. A method, comprising:
towing a first plurality of streamers, a second plurality of streamers, and a plurality of sources along a first sail line;
towing the first plurality of streamers, the second plurality of streamers, and the plurality of sources along a second sail line, wherein:
the first sail line and the second sail line are adjacent sail lines of a survey,
the plurality of sources are in a wide-tow source survey configuration,
the plurality of sources comprises K sources,
the first plurality of streamers comprises N streamers with S streamer separation between adjacent streamers,
the second plurality of streamers comprises n streamers,
a separation between the first sail line and the second sail line is greater than $((N+n) \times S)/2$; and
a crossline bin width W equals $S/(2 \times K)$; and
acquiring data with a CMP subline spacing over the illumination area that is at least as dense as 1 per W.

21. The method of claim 20, wherein each of an offset of the first receiver and an offset of the second receiver is less than 1 km.

22. The method of claim 20, further comprising:
actuating at least one of the plurality of sources to create a signal;
detecting the signal with a first receiver on a first streamer of a first plurality of streamers; and
detecting the signal with a second receiver on a second streamer of the second plurality of streamers, wherein:
the first plurality of streamers comprises a port outer region and a starboard outer region, and
the second plurality of streamers are interspersed with streamers from the first plurality of streamers in the port outer region and in the starboard outer region.

23. The method of claim 22, wherein each of the port outer region and the starboard outer region is defined by an outer-most streamer and a penultimate outer-most streamer.

24. The method of claim 20, further comprising:
storing all or a portion of the acquired data on one or more non-transitory, tangible computer-readable media, thereby completing the manufacture of a geophysical data product.

25. A system, comprising:
a survey vessel;
a plurality of sources in a wide-tow source configuration and coupled to the survey vessel;
a first plurality of streamers comprising a regular streamer spread and coupled to the survey vessel;
a second plurality of streamers coupled to the survey vessel; and
a controller aboard the survey vessel configured to cause towing of the plurality of sources along first and second adjacent sail lines in a survey, in which:
the regular streamer spread has a spread width from a port-most streamer to a starboard-most streamer;

the regular streamer spread has a midline centered between the port-most streamer and the starboard-most streamer;

the first plurality of streamers comprises a port outer region that is at least 25% of the spread width away from the midline towards port, and a starboard outer region that is at least 25% of the spread width away from the midline towards starboard;

the second plurality of streamers consists of streamers that are interspersed with streamers from the first plurality of streamers in the port outer region and in the starboard outer region;

the plurality of sources are arranged with a crossline source separation of at least $(1/K+n/2) \times S$ in which K corresponds to the number of sources in the plurality of sources, S corresponds to the separation distance between adjacent streamers in the first plurality of streamers, and n corresponds to the number of streamers in the second plurality of streamers; and a separation distance between the first sail line and the second sail line is at least $((N+n) \times S)/2$ in which N corresponds to the number of streamers in the first plurality of streamers.

26. The system of claim 25, wherein the plurality of sources comprises one of:

two sources having a crossline source separation of at least 100 m; and three sources having a crossline source separation of at least 50 m.

27. The system of claim 25, wherein:

the first plurality of streamers comprises at least twelve streamers having a streamer separation of at least 75 m;

the first plurality of streamers comprises a first receiver on a first streamer;

the second plurality of streamers comprises a second receiver on a second streamer; and each of an offset of the first receiver and an offset of the second receiver is less than 1 km.

28. The system of claim 25, wherein:

the first plurality of streamers comprises N streamers with S streamer separation between adjacent streamers; and a crossline separation between a streamer of the second plurality of streamers and each nearest streamer from the first plurality of streamers is S/2.

29. The system of claim 25, wherein:

no streamers are interspersed with streamers from the first plurality of streamers between the port outer region and the starboard outer region.

\* \* \* \* \*